(12) United States Patent
Barsness et al.

(10) Patent No.: US 10,078,973 B2
(45) Date of Patent: Sep. 18, 2018

(54) SURGICAL SIMULATORS AND METHODS ASSOCIATED WITH THE SAME

(71) Applicant: NORTHWESTERN UNIVERSITY, Evanston, IL (US)

(72) Inventors: Katherine A. Barsness, Glenview, IL (US); Lauren M. Davis, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 65 days.

(21) Appl. No.: 14/267,290

(22) Filed: May 1, 2014

(65) Prior Publication Data

US 2014/0329217 A1 Nov. 6, 2014

Related U.S. Application Data

(60) Provisional application No. 61/818,232, filed on May 1, 2013.

(51) Int. Cl.
*G09B 23/30* (2006.01)
*G09B 23/28* (2006.01)

(52) U.S. Cl.
CPC ......... *G09B 23/306* (2013.01); *G09B 23/285* (2013.01); *Y10T 29/49826* (2015.01)

(58) Field of Classification Search
CPC .... G09B 23/28; G09B 23/281; G09B 23/283; G09B 23/285; G09B 23/286; G09B 23/288; G09B 23/30; Y10T 29/49826
See application file for complete search history.

(56) References Cited

U.S. PATENT DOCUMENTS

| | | | | |
|---|---|---|---|---|
| 3,562,924 A | * | 2/1971 | Baerman et al. | G09B 23/288 434/265 |
| 3,740,854 A | * | 6/1973 | Black | A61C 19/10 434/263 |
| 4,288,222 A | | 9/1981 | Kling | |
| 5,873,732 A | * | 2/1999 | Hasson | G09B 23/286 434/262 |
| 6,077,083 A | | 6/2000 | Smith-Whitley et al. | |
| 8,323,029 B2 | * | 12/2012 | Toly | G09B 23/28 434/267 |
| 2005/0214727 A1 | * | 9/2005 | Stoianovici | G09B 23/28 434/262 |

(Continued)

OTHER PUBLICATIONS

International Search Report and Written Opinion for PCT/US2014/036347 dated Oct. 6, 2014, 12 pages.

*Primary Examiner* — Timothy A Musselman
(74) *Attorney, Agent, or Firm* — Klintworth & Rozenblat IP LLP

(57) ABSTRACT

Surgical simulators and methods associated with the same are provided. In one aspect, a surgical simulator includes a rib cage including a plurality of ribs, internal tissue positionable within the rib cage, and external tissue adapted to cover at least a portion of the rib cage. In another aspect, a method of manufacturing a surgical simulator includes forming a rib cage including a plurality of ribs, positioning internal tissue within the rib cage, and at least partially covering the rib cage with external tissue. In a further aspect, a method of modifying biologic tissue for use with a surgical simulator is provided.

27 Claims, 24 Drawing Sheets

(56) References Cited

U.S. PATENT DOCUMENTS

| | | | |
|---|---|---|---|
| 2008/0138778 A1* | 6/2008 | Eggert | G06F 19/3437 434/262 |
| 2008/0138781 A1* | 6/2008 | Pellegrin | G09B 23/34 434/274 |
| 2008/0227073 A1* | 9/2008 | Bardsley | G09B 23/30 434/267 |
| 2009/0068627 A1 | 3/2009 | Toly | |
| 2009/0311662 A1* | 12/2009 | Ramphal | G09B 23/288 435/1.1 |

* cited by examiner

SURGICAL SIMULATORS AND METHODS ASSOCIATED WITH THE SAME

RELATED APPLICATIONS

The present application claims the benefit of U.S. Provisional Patent Application No. 61/818,232, filed May 1, 2013, the contents of which are incorporated by reference herein in their entirety.

FIELD OF THE INVENTION

The present disclosure generally relates to surgical simulators and methods associated with the same and, more particularly, to neonatal surgical simulators and methods associated with the same.

BACKGROUND

Graduate medical education has undergone dramatic changes in the last decade. Surgical trainees and programs alike are now under increasing pressure to efficiently achieve and document competency in both skills acquisition and cognitive learning. These educational mandates are occurring simultaneous to national outcomes and patient safety initiatives. Simulation technology has emerged, as a reasonable expansion of modern medical education, to fit these seemingly dichotomous needs for training institutions. Existing training devices or simulators are low fidelity items generally comprised of a box with a piece of material sutured to the box. Such existing boxes also only teach a single task within a more complex multistep surgical procedure. In other words, such boxes do not reproduce the entire operation. Furthermore, such boxes do not replicate the intraoperative environment or the exact space limitations of the chest or abdominal cavity of a patient. Instead, the box may be empty. Moreover, such boxes do not provide a clear indication of relevant anatomy or the numerous anatomic pathologies that are common operative indications. Additionally, such boxes do not provide an opportunity to assess intraoperative decision-making specific to a complex operation, or the ability to assess an error in that decision-making process. Without relevant pathologic anatomy, size appropriate models, or an opportunity to assess intraoperative decision-making and error, improvements to surgical performance by surgeons may be difficult.

Pediatric surgery is a field particularly well suited to simulation technology. A number of the index procedures required for training are rare congenital anomalies. Further, the particular anatomy of the anomaly may vary widely. Esophageal atresia with or without a tracheoesophageal fistula (EA/TEF) is one such rare case with a number of different anatomic variations. In 1995, the mean number of EA/TEF repairs performed by a trainee in North America was 9.2 (range 2-20). By 2006, the mean number of repairs had dropped to 4.4 in the United States. With few opportunities for trainees to perform any EA/TEF repair, EA/TEF repair may not be feasibly taught to a high level of competence within a 2-year training period. Beyond the initial training period, practicing pediatric surgeons have even fewer opportunities to maintain or advance cognitive, technical and nontechnical skills for EA/TEF repair. With literature supporting an inverse relationship between case volume and surgical complications, relevant opportunities for deliberate practice and mastery learning are necessary to ensure optimal outcomes for infants and children.

Effective simulation models vary, according to the baseline skill level of the trainee. Box trainers focus on specific tasks, such as peg transfer and intracorporeal knot tying. These models are well suited for novice learners. However, advanced learners typically require high physical fidelity models, aiming to recreate the entire procedure, rather than just a single skill required during the procedure. In pediatric surgery, there are no validated procedural trainers for neonatal, infant or childhood surgical diseases.

Another rare congenital anomaly that requires surgical correction shortly after birth is diaphragmatic hernia (DH), which is a hole in a diaphragm that allows intestines to move into the chest cavity. The surgical repairs have historically been performed through a large abdominal incision. Newer surgical techniques allow the procedure to be performed using three small chest incisions (also known as thoracoscopic repair). The advantages with thoracoscopic repair include less scarring, less pain and faster recovery for children. However, a thoracoscopic repair in a newborn infant is challenging due to space limitations. The entire operation takes place inside a space the size of a chicken egg. Several studies on thoracoscopic DH repair show a higher recurrence rate, compared to the traditional repair. The higher recurrence is likely related to technical errors occurring during the thoracoscopic repair. High physical fidelity simulation would provide the opportunity to disseminate nationally the best practices for the performance of a thoracoscopic DH repair without a higher recurrence rate.

Duodenal atresia is another rare congenital anomaly that requires surgical repair shortly after birth. In this anomaly, the first part of the intestine (duodenum) is obstructed, preventing the infant from eating. Laparoscopic duodenal atresia repair is well described, but some authors have had higher complication rates than would otherwise be predicted for these infants. The complications were directly attributed to the learning curve of a difficult technical operation, and that with more experience, complication rates returned to an acceptable low baseline rate.

Additionally, Gastrostomy tube (GT) placement is a common procedure that is performed in infants and children who present with feeding failure secondary to prematurity, gastroesophageal reflux, primary or recurrent aspiration, and other indications. Placement of gastrostomy tubes in infants using a laparoscopic approach has been described as safe, efficacious, and may have a lower complication rate than percutaneous endoscopic gastrostomy. The U-stitch technique, is one of the most commonly used techniques for laparoscopic GT placement. Although laparoscopic GT placement is quickly learned and demonstrated, there are no pediatric GT placement simulators currently available in the market.

Studies have shown that simulation can be a valuable tool for training pediatric surgeons to perform a surgical procedure such as, for example, thoracoscopic repair of rare congenital anomalies. Previously evaluated simulators may require use of fetal bovine or porcine tissue blocks within the simulators. In some instances, real or biologic tissue blocks may be expensive and may not be readily available in some parts of the world.

SUMMARY

Simulators in the present disclosure may represent the only pediatric models that have high physical fidelity, represent complete procedures, and have published data to support validation.

Simulation-based education with relevant high physical fidelity models would provide the opportunity to move the learning curve out of the operating room (and away from live patients) and into a simulation laboratory.

In one aspect, a surgical simulator is provided.

In one aspect, a neo-natal surgical simulator is provided.

In one aspect, a high fidelity, anatomically correct real or biologic tissue simulator or simulation model for thoracoscopic esophageal atresia/tracheoesophageal fistula (EA/TEF) repair is provided.

In one aspect, a high fidelity, anatomically correct real or biologic tissue simulator or simulation model for a thoracoscopic DH report is provided.

In one aspect, a high fidelity, anatomically correct real or biologic tissue simulator or simulation model for a duodenal atresia repair is provided.

In one aspect, a surgical simulator that reproduces all key components of a thoracoscopic repair/procedure, including size/space limitations of a neonate, to improve minimally invasive skill sets of pediatric surgeons is provided.

In one aspect, a surgical simulator is provided that is an exact replica with respect to rib size, intercostal spacing, and chest dimensions, of a neonatal chest and includes a replica diaphragm and intestine. Such replica diaphragm and intestine may be either biologic or non-biologic material, or a combination thereof. The surgical simulator provides the necessary components to provide all the opportunities for error and error assessment that occur during a surgical procedure.

In one aspect, a low cost, reusable neonatal simulator that replicates key technical components of a laparoscopic GT placement is provided. The GT simulator may be used for surgical education, thereby taking the learning curve of GT placement out of the operating room and into the simulation laboratory.

In one aspect, a surgical simulator is provided that reproduces the entire operation or surgical procedure.

In one aspect, a surgical simulator is provided that replicates an intraoperative environment and all elements requiring repair in a patient's chest.

In one aspect, a surgical simulator is provided that replicates an intraoperative environment and all elements requiring repair in a patient's abdomen.

In one aspect, a surgical simulator is provided that can be used for error occurrence and error assessment in order to improve performance of surgeons.

In one aspect, a surgical simulator is provided and includes a rib cage including a plurality of ribs, internal tissue positionable within the rib cage, and external tissue adapted to cover at least a portion of the rib cage.

In one aspect, a method of manufacturing a surgical simulator is provided and includes forming a rib cage including a plurality of ribs, providing internal tissue adapted to be positioned within the rib cage, and providing external tissue adapted to at least partially cover the rib cage.

In one aspect, a low-cost, portable simulator for esophageal atresia with tracheoesophageal fistula (EA/TEF) and duodenal atresia (DA) is provided and recreates the 3-dimensional challenges for minimally invasive repair. The simulator is fully simulates the thoracic and abdominal cavities and contains at least one of biologic tissue and synthetic tissue that replicates required anatomy.

In one aspect, a surgical simulator is provided and includes a rib cage including a plurality of ribs, internal tissue positionable within the rib cage, and external tissue adapted to cover at least a portion of the rib cage.

In one aspect, the simulator further includes a base adapted to support the rib cage.

In one aspect, the base defines a receptacle adapted to receive a portion of the rib cage.

In one aspect, a portion of the rib cage is embedded in the base.

In one aspect, the rib cage replicates an entire rib cage of at least one of a neonate, an infant and a child.

In one aspect, the rib cage replicates a portion of a rib cage of at least one of a neonate, an infant and a child.

In one aspect, the rib cage replicates one of a right side or a left side of a rib cage of at least one of a neonate, an infant and a child.

In one aspect, the simulator further includes a scapula.

In one aspect, the simulator further includes a sternum.

In one aspect, the simulator further includes a clavicle.

In one aspect, the internal tissue is internal biologic tissue.

In one aspect, the internal biologic tissue is modified from its original configuration to represent a congenital anomaly.

In one aspect, the internal tissue is synthetic internal tissue.

In one aspect, the rib cage includes at least one removable portion selectively removable from the rib cage.

In one aspect, the removable portion includes at least one rib.

In one aspect, the simulator further includes a tissue stabilizer coupled to the rib cage.

In one aspect, the tissue stabilizer includes a first portion and a second portion adapted to be separated from one another. The first portion includes a plurality of projections and the second portion includes a plurality of apertures adapted to receive the plurality of projections.

In one aspect, the tissue stabilizer is adapted to engage at least one of the internal tissue and the external tissue.

In one aspect, the simulator further includes a pelvis member coupled to the rib cage to provide at least a portion of an abdomen of the surgical simulator.

In one aspect, the pelvis member is selectively removable from the rib cage.

In one aspect, the simulator further includes a base adapted to support the rib cage. The internal tissue is coupled to at least one of the rib cage and the base, and the external tissue is coupled to at least one of the rib cage and the base.

In one aspect, a method of manufacturing a surgical simulator is provided and includes forming a rib cage including a plurality of ribs, positioning internal tissue within the rib cage, and at least partially covering the rib cage with external tissue.

In one aspect, forming a rib cage further includes forming a rib cage that replicates an entire rib cage of a neonate.

In one aspect, forming a rib cage further comprises forming a rib cage that replicates a portion of a rib cage of at least one of a neonate, an infant and a child.

In one aspect, forming a rib cage further comprises forming a rib cage that replicates one of a right side or a left side of a rib cage of at least one of a neonate, an infant and a child.

In one aspect, the method further includes forming a base and supporting the rib cage on the base.

In one aspect, the method further includes coupling a pelvis member to the rib cage to provide an abdomen of the surgical simulator.

In one aspect, coupling the pelvis member includes one of selectively coupling the pelvis member to the rib cage or unitarily forming the pelvis with the rib cage.

In one aspect, a method of modifying biologic tissue for use with a surgical simulator is provided. The method includes providing biologic tissue in an original condition, modifying the biologic tissue from the original condition to a congenital anomaly condition, positioning the modified biologic tissue in a surgical simulator, and performing a surgical procedure on the modified biologic tissue.

In one aspect, the biologic tissue is at least one of bovine biologic tissue, porcine biologic tissue, rabbit biologic tissue and chicken biologic tissue.

In one aspect, the congenital anomaly condition is one of esophageal atresia with a tracheoesophageal fistula, esophageal atresia without a tracheoesophageal fistula, diaphragmatic hernia, duodenal atresia, and gastrostomy tube placement.

In one aspect, the biologic tissue is a fetal bovine diaphragm, and modifying further includes rotating a central tendon of the fetal bovine diaphragm to a posterior lateral location to represent a hernia defect.

In one aspect, the method further includes securing rotated central tendon of the fetal bovine diaphragm within the surgical simulator with a tissue stabilizer, and positioning the tissue stabilizer at a location associated with a tenth rib of a rib cage.

In one aspect, the biologic material is one of a fetal porcine block or a fetal bovine mediastinal block including at least one of a heart, a lung, a trachea, an esophagus, an aorta, a liver, a stomach and a spleen, and wherein the congenital anomaly is one of esophageal atresia or diaphragmatic hernia.

In one aspect, the biologic material is second trimester fetal bovine mediastinal tissue, and modifying further includes transecting an esophagus at a level of a carina, purse-string suturing a posterior of the carina, shorting a proximal esophagus about one centimeter, and purse-string suturing the proximal esophagus to provide an esophageal gap of about two centimeters.

In one aspect, the biologic material includes at least one of a heart, a lung, an aorta, a trachea and an esophagus.

In one aspect, the biologic material includes a heart, lungs, an aorta, a trachea and an esophagus.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
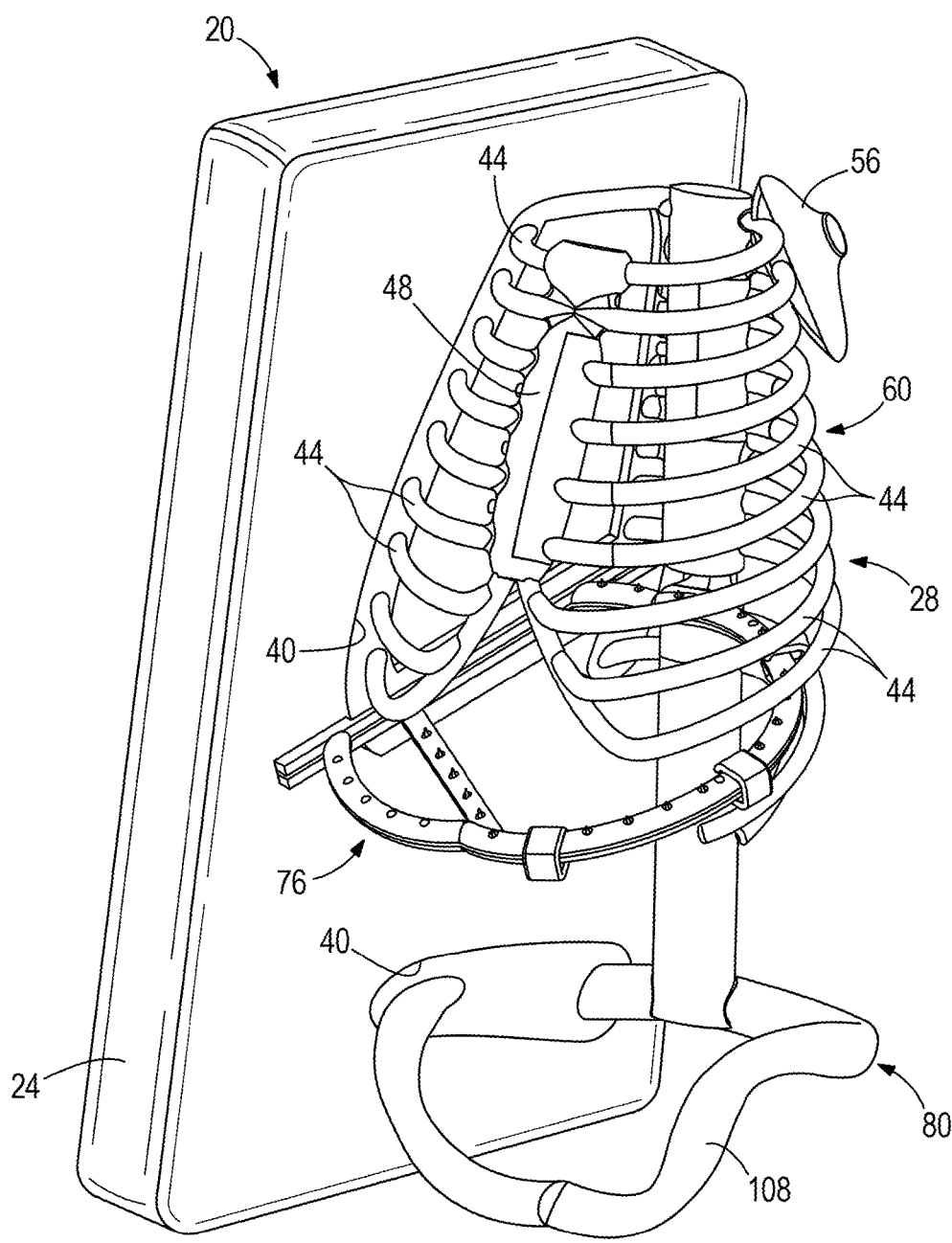
FIG. 1 is an isometric view of one example of a surgical simulator, in this example the simulator may be used for diaphragmatic hernia repair, according to one aspect of the present disclosure.
Figure 2:
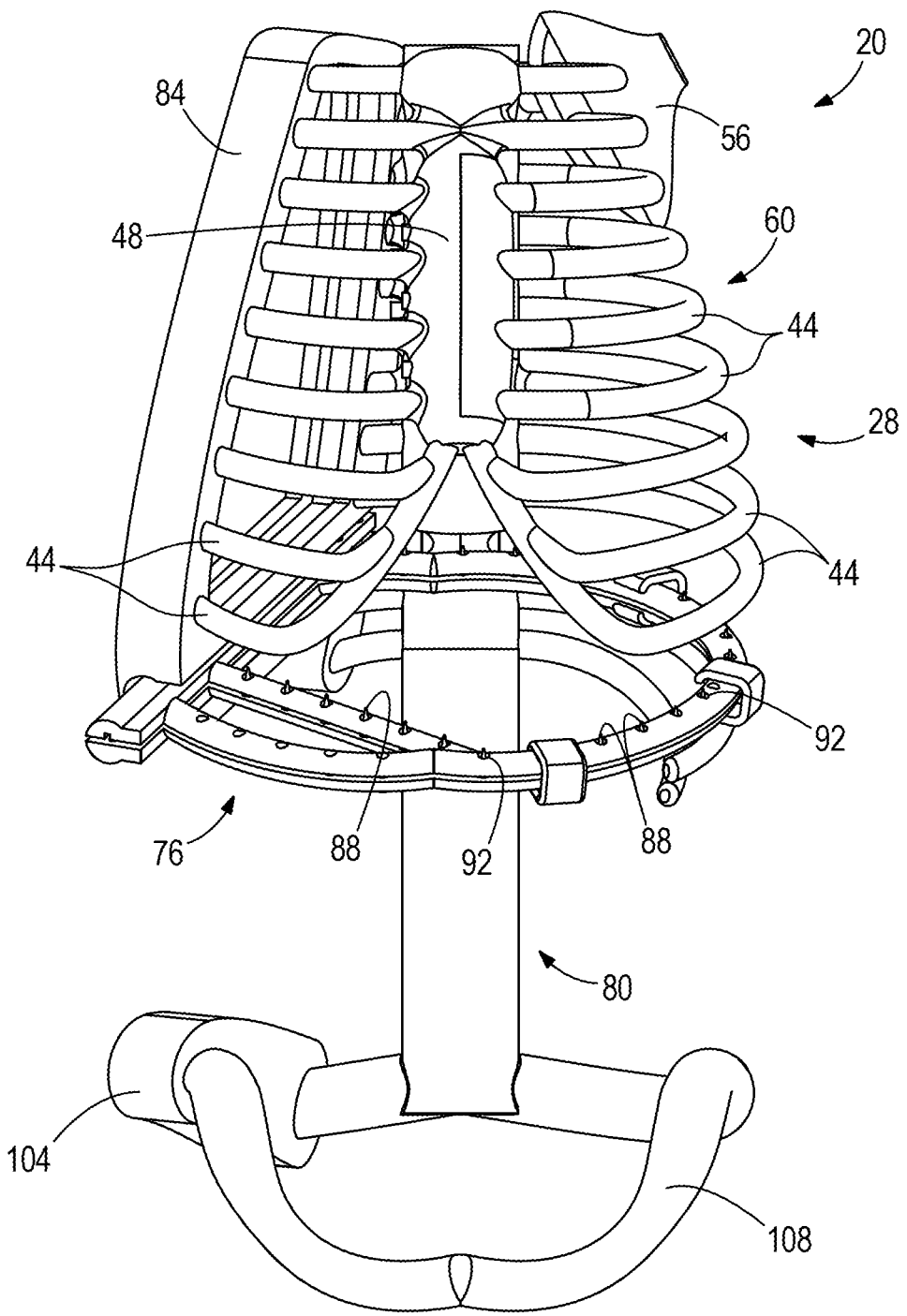
FIG. 2 is an isometric view of a portion of the surgical simulator shown in FIG. 1, according to one aspect of the present disclosure.
Figure 3:
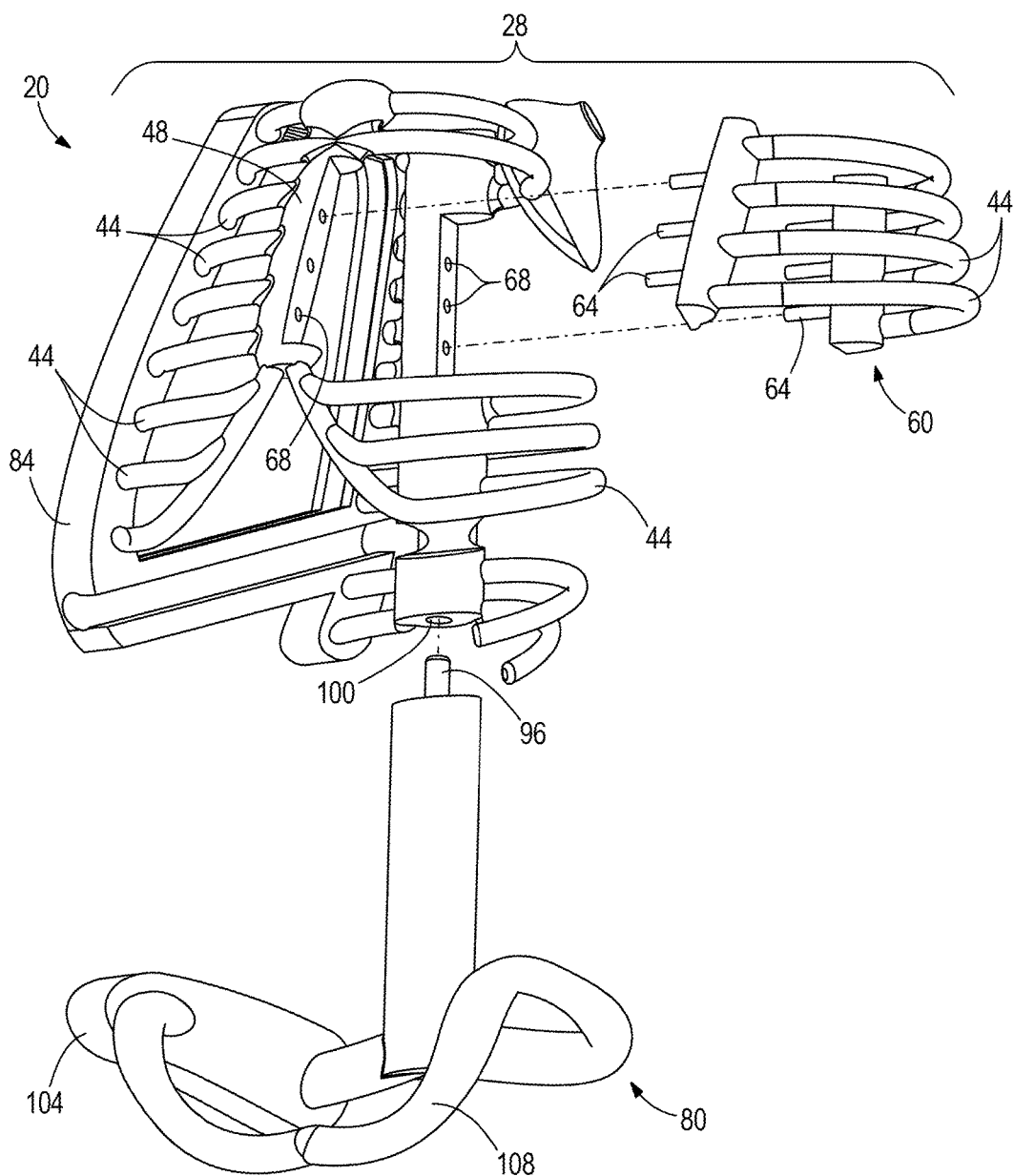
FIG. 3 is an exploded view of a portion of the surgical simulator shown in FIG. 1, according to one aspect of the present disclosure.
Figure 4:
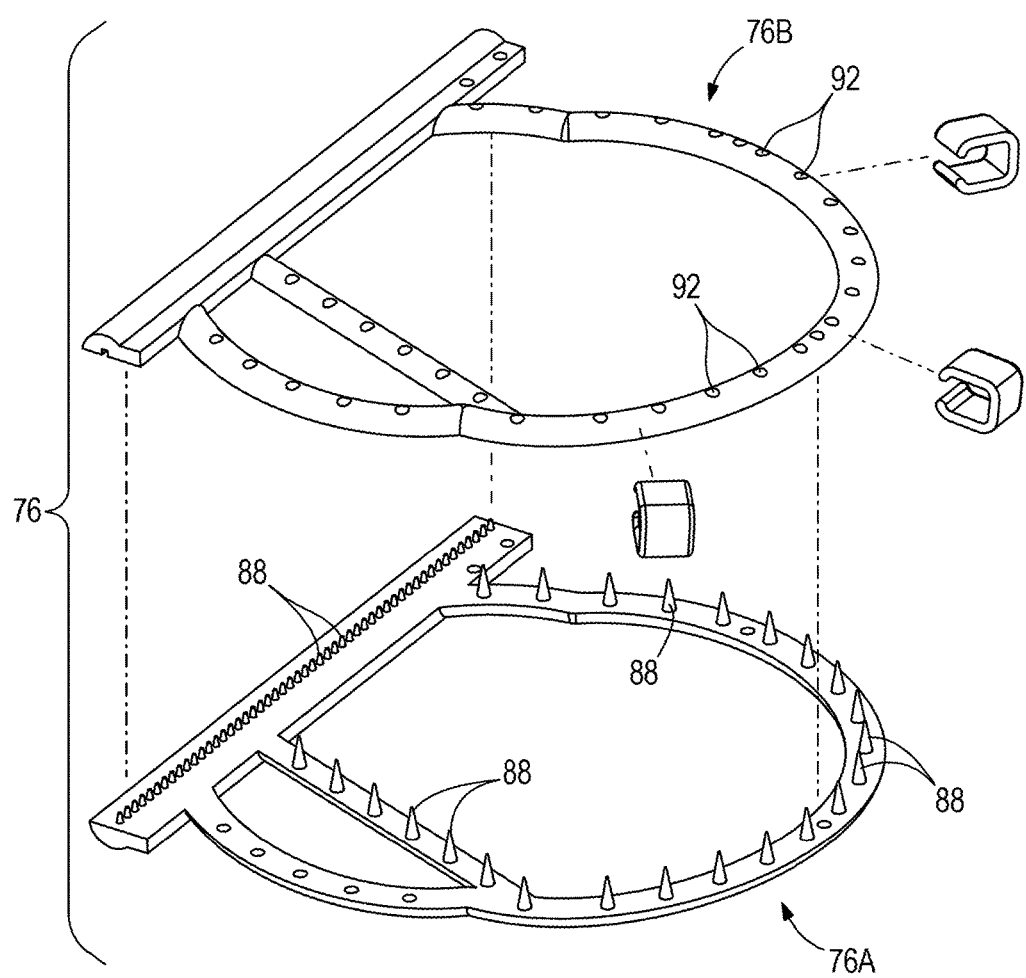
FIG. 4 is an exploded view of one example of a tissue stabilizer of the surgical simulator shown in FIG. 1, according to one aspect of the present disclosure.
Figure 5:
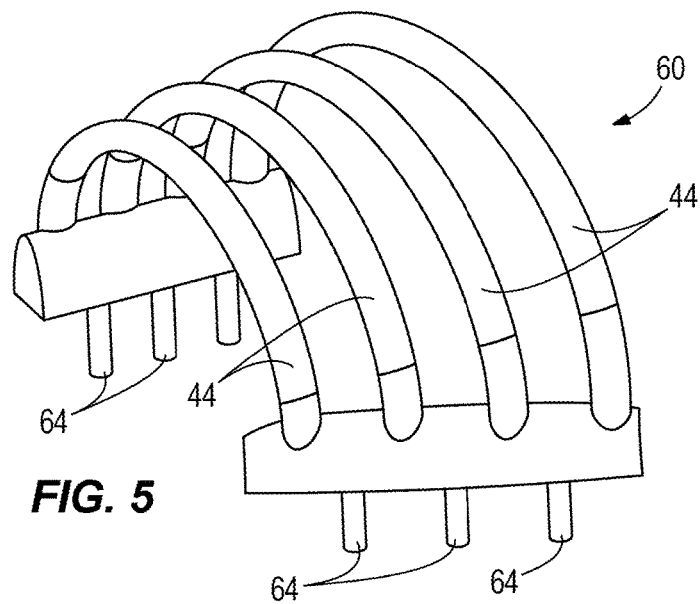
FIG. 5 is an isometric view of one example of a removable portion of the simulator shown in FIG. 1, according to one aspect of the present disclosure.
Figure 6:
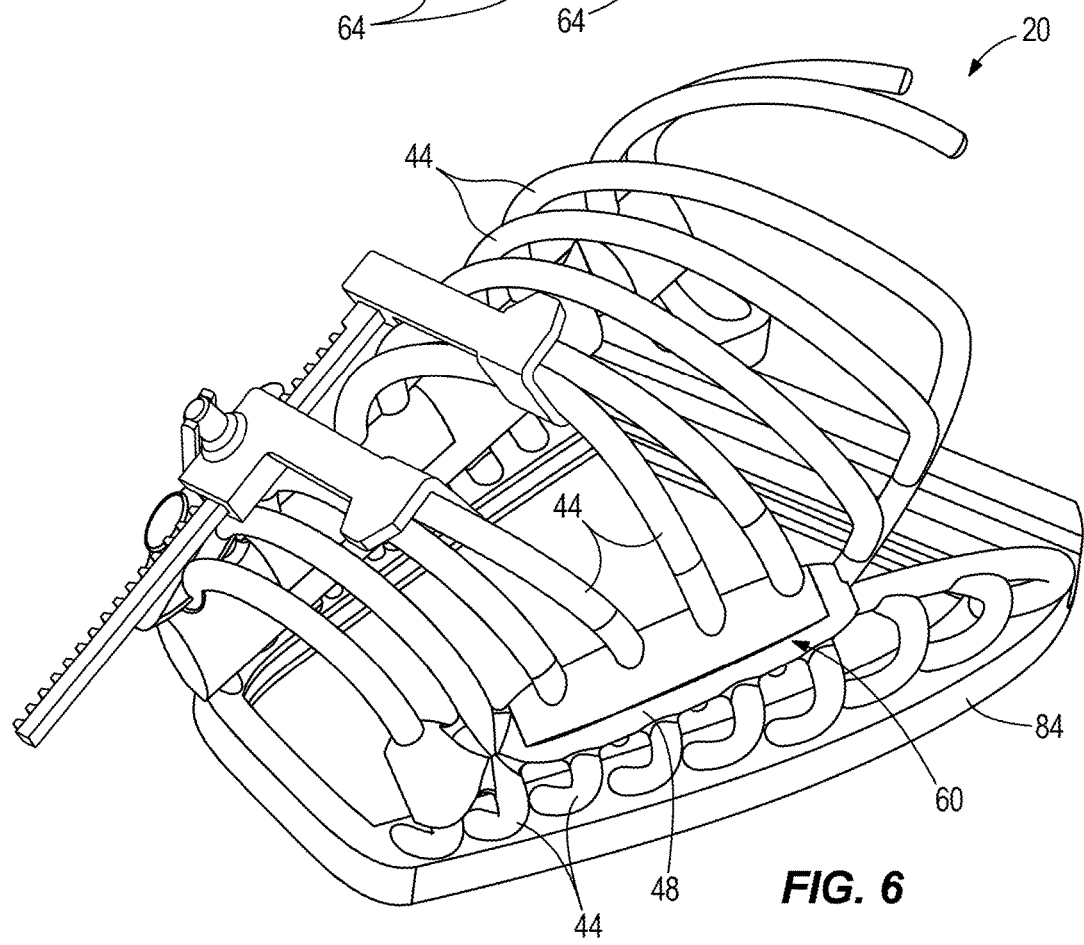
FIG. 6 is an isometric view of a portion of the simulator shown in FIG. 1 with a spreading mechanism spreading apart ribs of the simulator, according to one aspect of the present disclosure.
Figure 7:
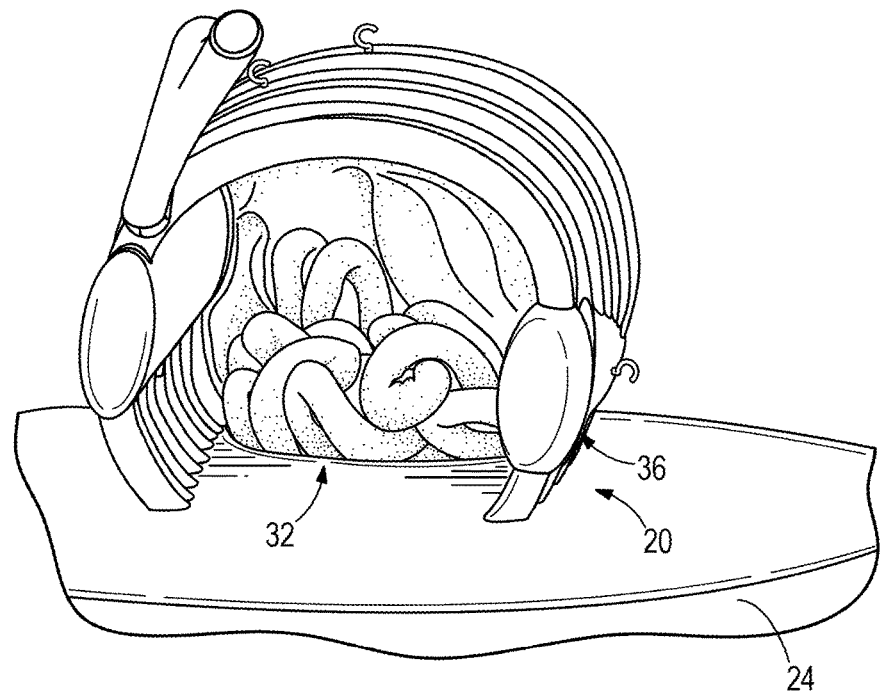
FIG. 7 is an elevational view of the simulator shown in FIG. 1 with real or biologic internal tissue positioned in the simulator, according to one aspect of the present disclosure.
Figure 8:
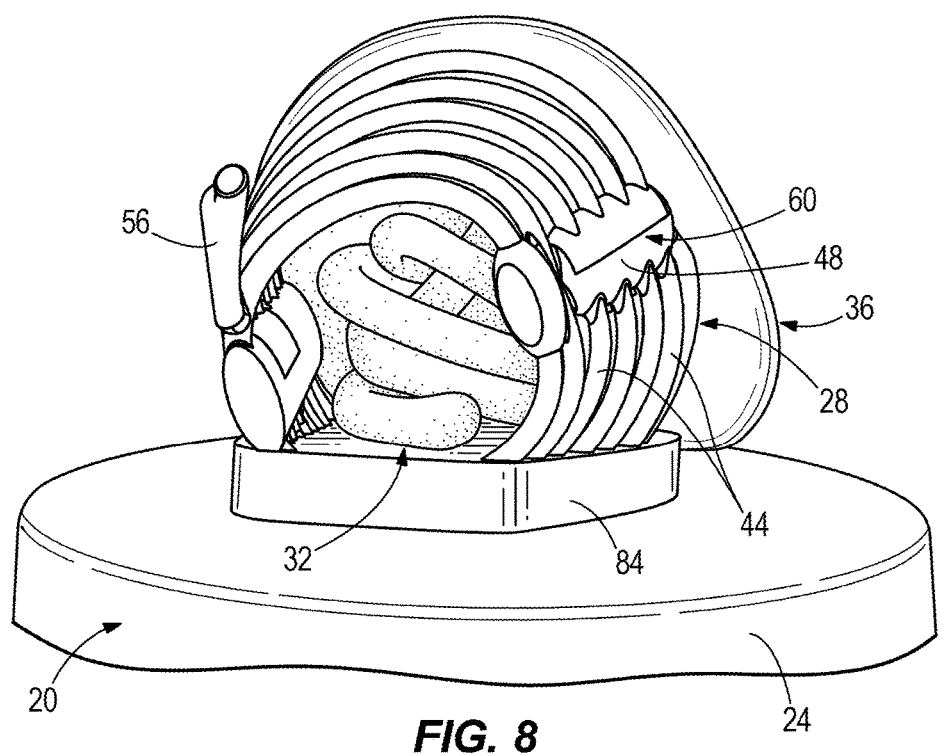
FIG. 8 is an isometric view of the simulator shown in FIG. 1 with synthetic internal tissue positioned in the simulator, according to one aspect of the present disclosure.
Figure 9:
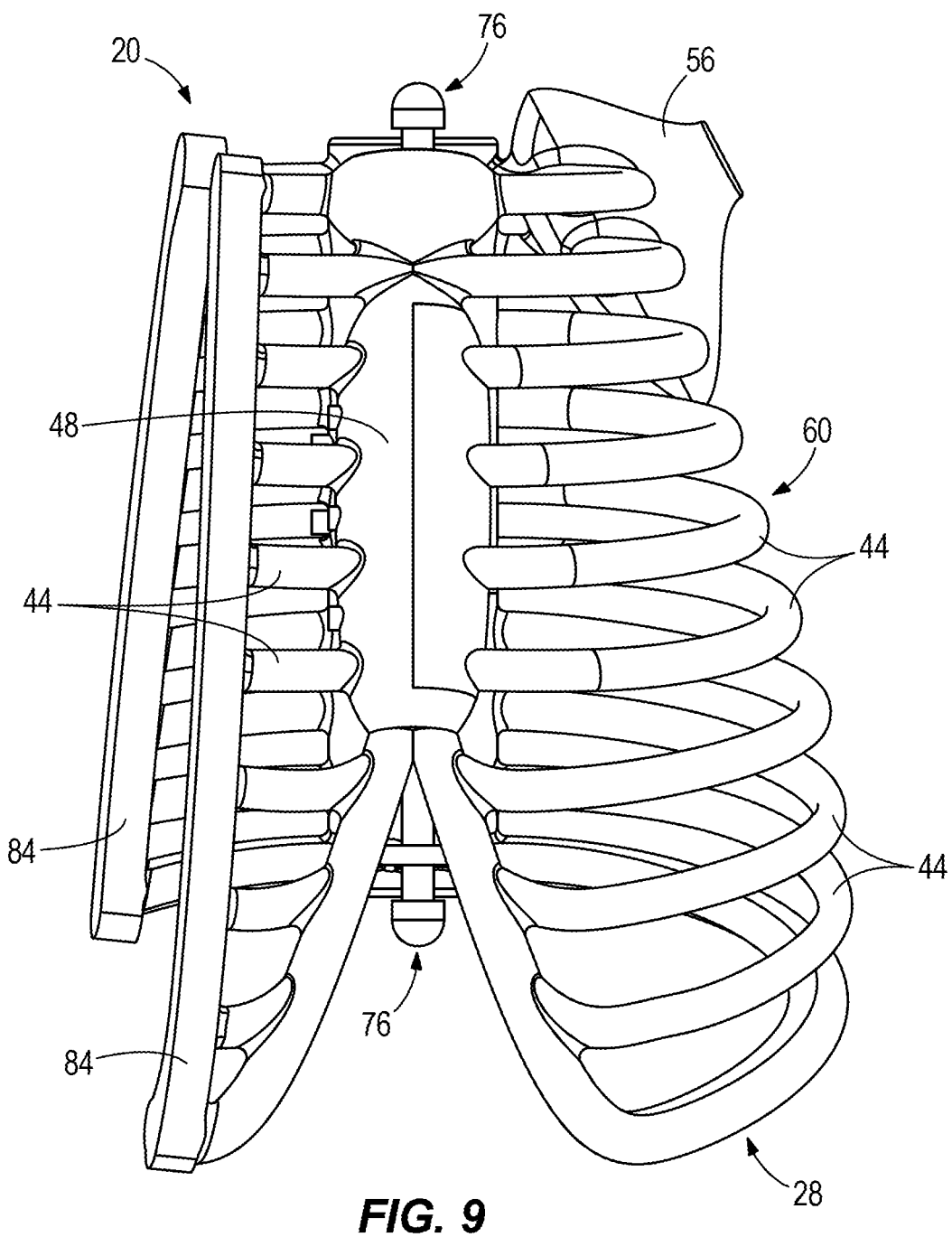
FIG. 9 is an isometric view of another example of a surgical simulator with the simulator adapted to include a base, in this example the simulator may be used for lobectomy, according to one aspect of the present disclosure.

Surgical simulators and methods of using the same are included in the present disclosure. These surgical simulators are very useful in training individuals how to perform certain pediatric surgical procedures so that when a real surgery is required, the individuals are able to properly perform the surgical procedures with a high level of accuracy and success.

The surgical simulators of the present disclosure may be used to train and prepare individuals for a wide variety of pediatric surgical procedures. Exemplary pediatric surgical procedures for which the surgical simulators may be used to train include, but are not limited to, esophageal atresia repair, tracheoesophageal fistula repair, diaphragmatic hernia or eventration repair, lung/mediastinal biopsy, lobectomy, esophagectomy/esophageal myotomy, aortopexy, tracheal reconstruction, cardiac procedures, thymectomy, or any other thoracic or abdominal surgical procedures.

One exemplary surgical procedure that will be described in more detail herein includes thoracoscopic repair of esophageal atresia with tracheoesophageal fistula (EA/TEF), which is a technically challenging surgical procedure. This congenital anomaly is relatively rare (occurring in 1 out of 3500 live births). Therefore, training opportunities for surgical trainees are limited. Description of this exemplary surgical procedure is for exemplary purposes only, demonstrates principles of the present disclosure, and is not intended to limit the present disclosure in any manner.

The exemplary surgical simulators of the present disclosure replicate anatomy of a newborn (e.g., neonatal) infant (also known as a neonate). In one example, a surgical simulator replicates a newborn infant chest. In another example, a surgical simulator replicates a portion of a newborn infant chest. In a further example, a surgical simulator replicates a newborn infant abdomen. In still another example, a surgical simulator may replicate any portion of a newborn or any combination of multiple portions of a newborn. Surgical simulators of the present disclosure may assume the shape of a wide variety of other anatomy of a newborn infant, and all of such possibilities are intended to be within the spirit and scope of the present disclosure. In some examples, surgical simulators may be low-cost and reusable. In some examples, surgical simulators may include low cost and accessible tissue or tissue substitute to replicate the anatomy associated with the surgical simulator. For example, when the surgical simulator is equipped to simulate/replicate an EA/TEF surgical procedure, the tissue or tissue substitute will be formed to replicate the anatomy of EA/TEF.

It should be understood that the description and drawings included herein may be associated with a particular anatomy of a newborn or a particular surgical procedure, but such description and drawings are provided for exemplary purposes to demonstrate principles of the present disclosure and are not intended to be limiting upon the present disclosure. Rather, the present disclosure is intended to encompass any anatomy of newborn infants and any surgical procedure performed on newborn infants, and all of such possibilities are intended to be within the spirit and scope of the present disclosure.

With reference to FIGS. 1-35, a plurality of examples of simulators 20 are illustrated and generally relate to thoracic (i.e., chest) simulators, abdominal simulators, or both thoracic and abdominal simulators of a newborn or neonatal infant. In some examples, the simulators include a base 24, a rib cage 28, internal tissue 32 and external tissue 36. The base 24 defines a receptacle 40 therein adapted to receive a portion of the rib cage 28 therein for supporting the rib cage 28 and inhibiting undesired movement of the rib cage 28. The base 24 may have any shape and may be made of a wide variety of materials such as, for example, silicone, plastic, metal, platinum-cured silicon rubber, etc. The base 24 may also provide stability to the internal tissue within the rib cage 28.

Figure 28:
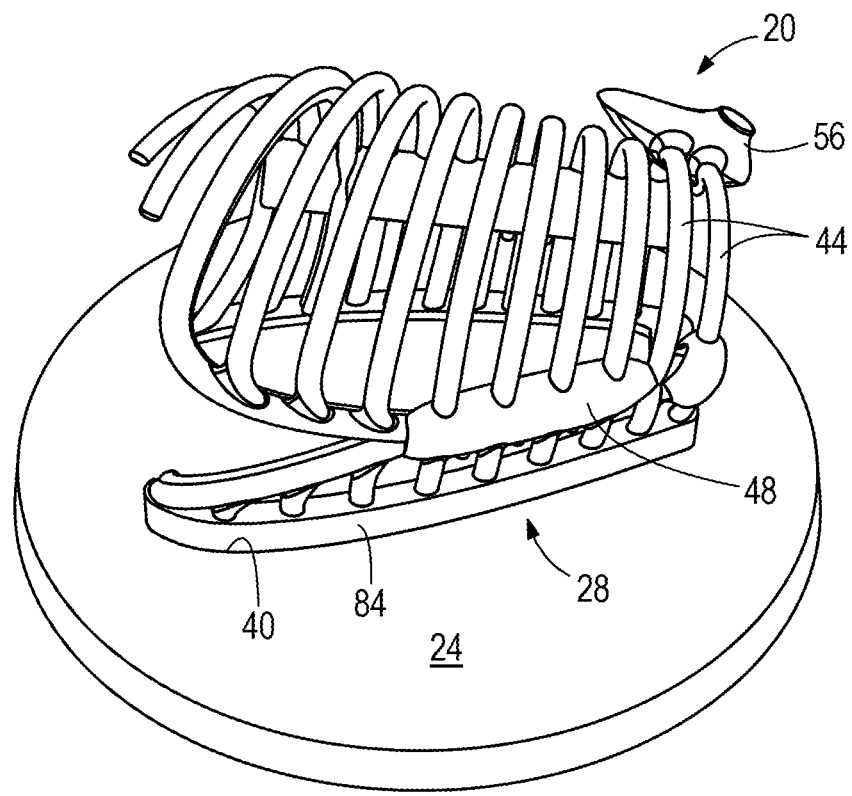
FIG. 28 is an isometric view of still a further example of a surgical simulator, according to one aspect of the present disclosure.
Figure 29:
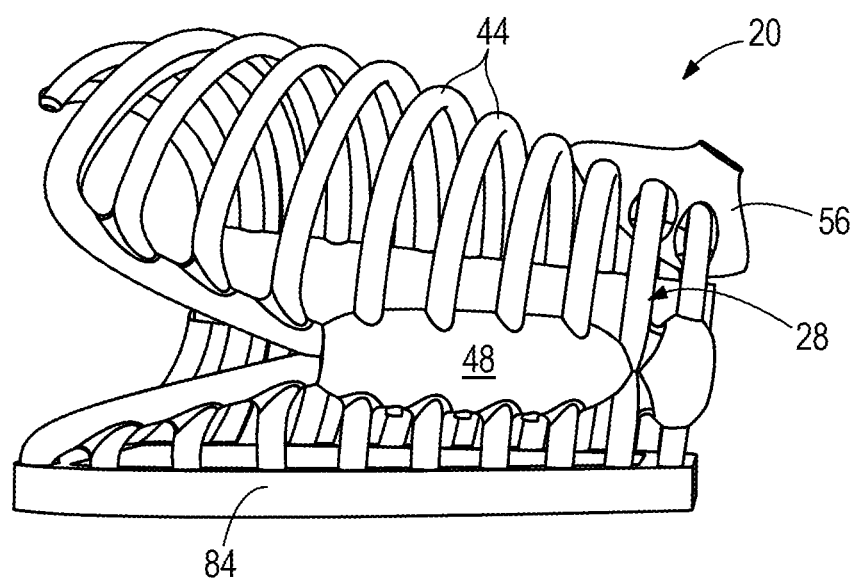
FIG. 29 is an isometric view of yet another example of a surgical simulator, according to one aspect of the present disclosure.
Figure 30:
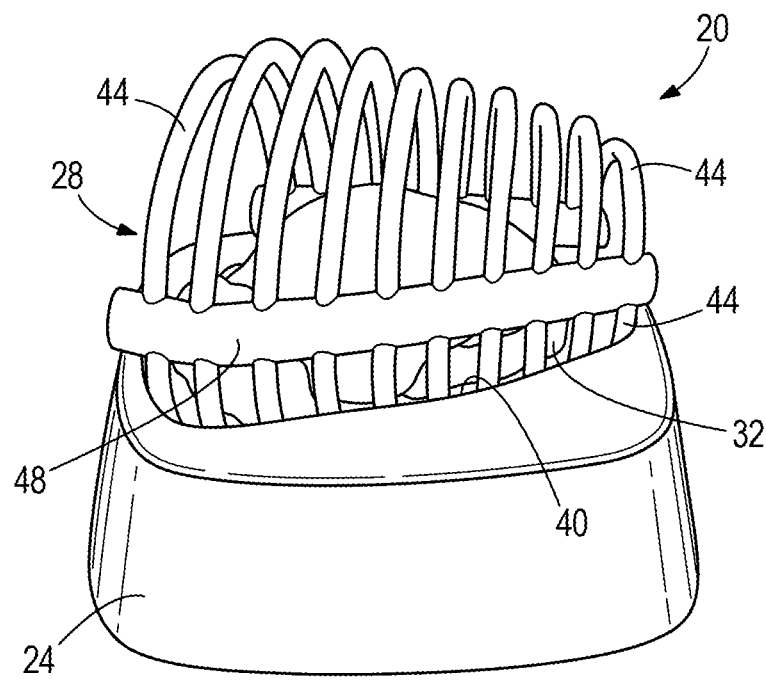
FIG. 30 is an isometric view of yet a further example of a surgical simulator including an example of an internal tissue therein, according to one aspect of the present disclosure.

The rib cage 28 of these exemplary simulators can vary between simulators. For example, the rib cage 28 may be a full rib cage, a right side only of a rib cage, a left side only of a rib cage, or some other portion of a rib cage. In FIGS. 1-4, a first example of a simulator is illustrated and the rib cage 28 is generally a left side of a rib cage. In FIG. 9-12, a second example of a simulator is illustrated and the rib cage 28 is also generally a left side of a rib cage. In FIGS. 13-19, a third example of a simulator is illustrated and the rib cage 28 is generally a right side of a rib cage. In FIGS. 20-27, a fourth example of a simulator is illustrated and the rib cage 28 includes the bottom four ribs of a neonatal rib cage. In FIG. 28, a fifth example of a simulator is illustrated and the rib cage 28 is generally a right side of a rib cage. In FIG. 29, a sixth example of a simulator is illustrated and the rib cage 28 is generally a right side of a rib cage. In FIG. 30, a seventh example of a simulator is illustrated and the rib cage 28 is generally an entire rib cage.

With particular reference to FIGS. 1-8, the first example of a simulator 20 will be described in more detail. In this illustrated example, the rib cage 28 represents a portion of a newborn infant rib cage and, more particularly, a left side of a newborn infant rib cage. This example relates to the left side of a newborn infant rib cage, which can be utilized to perform surgical procedures often performed in, on, and through a left side of a neonate chest. One example of a surgical procedure includes diaphragmatic hernia repair. Alternatively, as indicated above, the rib cage 28 may be an entire rib cage of a newborn infant, a right side of a newborn infant rib cage, a left side of a newborn infant rib cage, or some other portion of a newborn rib cage. The rib cage 28 may be made of a variety of different materials such as, for example, plastic, metal, etc. In some examples, the rib cage 28 may be made of a material that may allow flexibility of portions of the rib cage 28, thereby mimicking real infant bone or cartilage, while having resiliency to return to and maintain the original structure of the rib cage 28. In some examples, some portions of the rib cage 28 may be more flexible than other portions of the rib cage 28. In some examples, individual ribs 44 of the rib cage 28 may not themselves be flexible, but a base of the individual ribs 44 where they connect to the sternum, base, or other portion of the simulator may be flexible. Additionally, the rib cage 28 may be made of a material that enables sutureability of portions of the rib cage 28.

As indicated above, the simulator 20 may be sized to closely replicate the size of a newborn or neonatal infant. Even within this characterization of the simulator, newborn or neonatal infants may range in size (i.e., be within various percentile ranges). Thus, the simulator may have a variety of different sizes to replicate various sizes and percentiles of newborn or neonatal infants. Examples of measurements that may be relied upon to replicate a newborn infant include, but are not limited to, inner width of bony thorax at the hemidiaphragem, width of thorax at inner aspects of eighth ribs, widest internal width of bony thorax and the length of the thoracic spine, and, particularly for the scapula, scapular length, width, and height may be used to accurately replicate the scapula.

The rib cage 28 includes a variety of different elements. For example, the rib cage 28 includes a plurality of ribs 44, a sternum 48, a clavicle 52, and a scapula 56. Alternatively, the rib cage 28 may include more or less elements of a rib cage. The thickness of the ribs 44 may be varied along with the intercostal spacing between the ribs. In other examples, variations may be made to the sternum 48 to allow for sternotomy. The clavicle 52 and scapula 56 may assist in identifying chest wall landmarks. In some surgical procedures, using thoracoscopic, robotic or standard instruments requires flexibility of the ribs or rib cage 28 to spread at least 4 rib spaces (e.g., thoracotomy) or about 5 centimeters apart (e.g., sternotomy).

In the illustrated example, a portion of the rib cage 28 may be selectively removable and replaceable. Such removability and replacability allows the replacement of worn out or damaged portions of the rib cage 28. Certain surgical procedures cause damage to particular portions of the rib cage 28. After repeated performance of the same procedure, the associated portion of the rib cage 28 may become worn out, damaged or break. Rather than dispose of the entire simulator, the damaged or broken portion of the rib cage 28 may be removed and replaced with a new portion of the simulator. In some examples, a particular surgical procedure may damage or break particular ribs of the rib cage 28. Thus, a removable portion 60 of the rib cage 28 may include a plurality of ribs 44. In other examples, the sternum 48 may break or become damaged during surgical procedures. Thus, the removable portion of the rib cage 28 may be the sternum. In further examples, the rib cage 28 may include multiple removable portions 60. For example, such multiple removable portions 60 may include a first removable portion comprised of a plurality of ribs and a second removable portion comprised of the sternum. The removable portion 60 of the rib cage 28 may be coupled to the remainder of the rib cage 28 in a variety of manners including, but not limited to, snap-fit comprised of one or more projections 64 snapping into one or more recesses or apertures 68, a friction-fit or interference-fit comprised of one or more projections 64 being positioned in one or more recesses or apertures 68 sized slightly smaller than the projections 64 to provide friction or an interference between the projections 64 and the apertures 68, fasteners, snaps, hook-and-loop type fastener, adhesive, or any other manner of coupling.

The rib cage 28 may also include one or more inserts or mechanisms adapted to stabilize other elements of the simulator or standardize surgical procedures. For example, a distal rib of the rib cage 28 may be selectively removed and coupled to the rib cage 28 to accommodate a diaphragmatic hernia procedure, aorta procedure, trachea procedure, etc.

Figure 31:
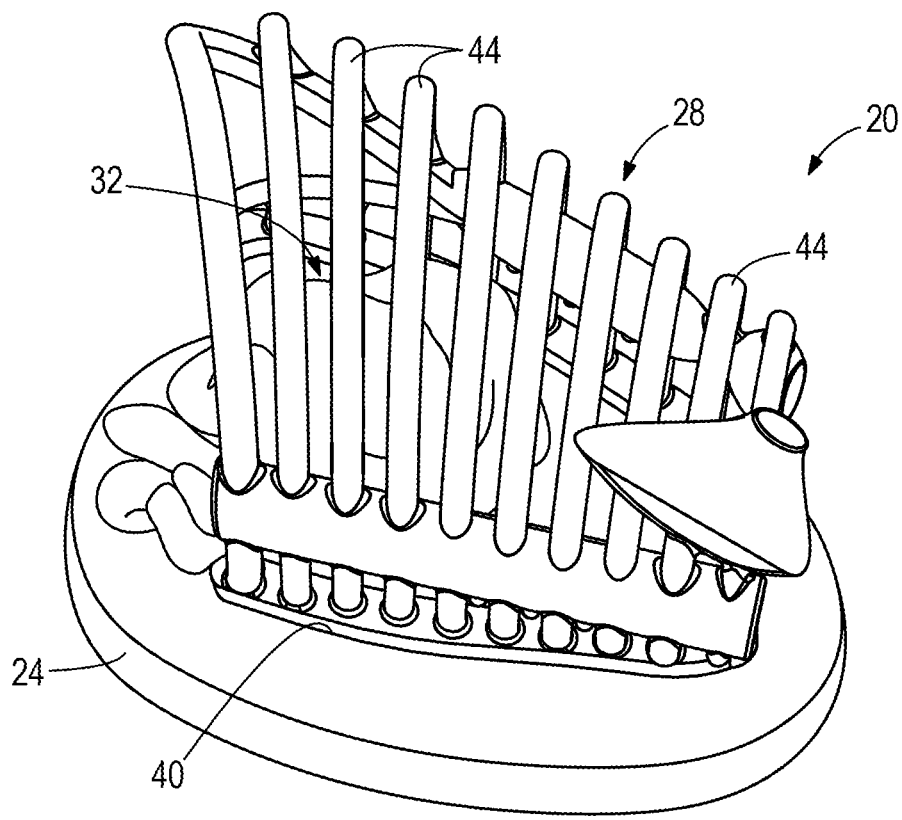
FIG. 31 is an isometric view of another example of a surgical simulator including exemplary internal tissue therein, according to one aspect of the present disclosure.
Figure 32:
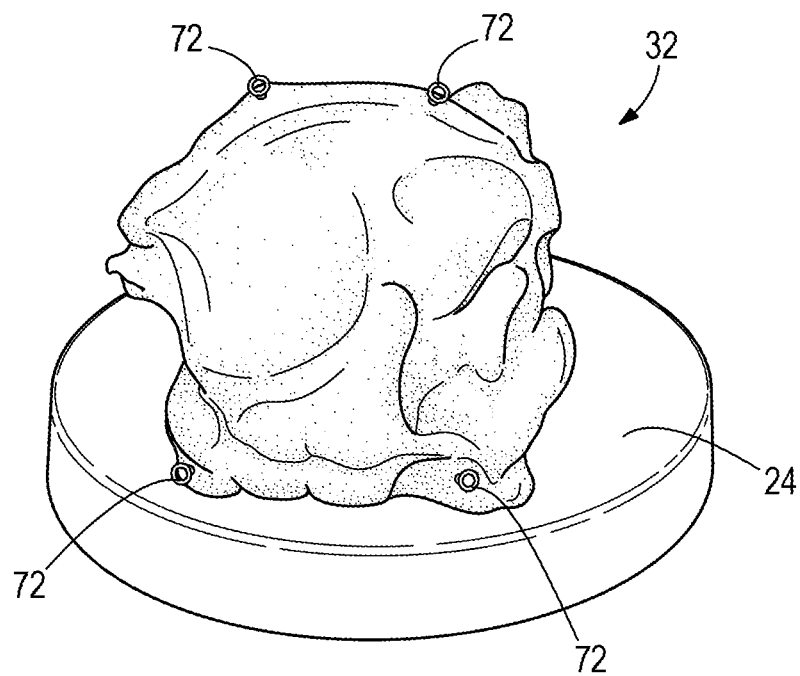
FIG. 32 is an isometric view of the internal tissue shown in FIG. 31, according to one aspect of the present disclosure.
Figure 33:
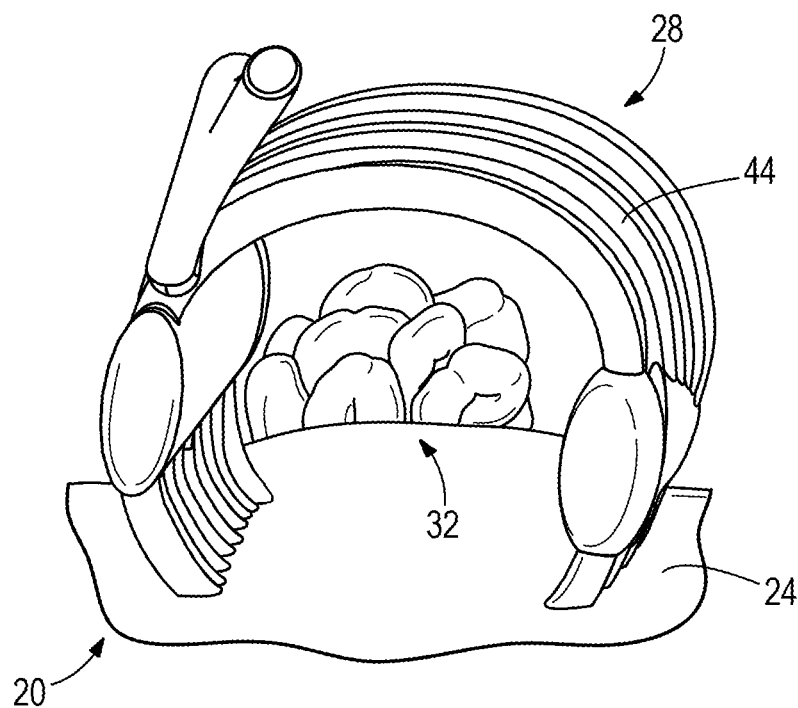
FIG. 33 is an elevational view of the surgical simulator and internal tissue shown in FIG. 31, according to one aspect of the present disclosure.

With continued reference to FIGS. 1-8 and additional reference to FIGS. 31-33, a variety of internal tissues 32 may be positioned within the rib cage 28 to replicate different anatomy of a newborn infant. For example, with particular reference to FIGS. 31-33, the internal tissue 32 may replicate anatomy required for a diaphragmatic hernia (DH) repair. In this example, a second trimester fetal bovine diaphragm is used and a central tendon of the bovine diaphragm is rotated to the posterior lateral location to recreate a typical hernia defect, and is secured in a tissue stabilizer 76 (e.g., configured to stabilize a diaphragm) that slides into a space for the $10^{th}$ rib, thereby replicating an exact position of a diaphragm in a newborn infant. In one example, the stabilizer (for real or biologic tissue, or synthetic tissues) is composed of two portions 76A, 76B. A first portion 76A includes projections or teeth 88 to engage and/or pierce (partially or entirely through) the real or biologic tissue, or synthetic tissue (e.g., a diaphragm), and a second portion 76B that includes a plurality of apertures 92 adapted to receive the projections 88 and secure the tissue. In some examples, clamps or other coupling members may be used to secure the first and second portions 76A, 76B together. In other examples, the projections 88 may press-fit, friction-fit, interference-fit, etc., into the apertures 92 to couple the first and second portions 76A, 76B together. It should be understood that the first and second portions 76A, 76B may be coupled together in any manner and all of such possibilities are intended to be within the spirit and scope of the present disclosure. In some examples, real tissue or synthetic tissue may be secured by hooks 72. Fetal bovine intestine is cut to about 30% of its total length. Ends of the cut bovine intestine are secured to the base 24 and the remainder of the intestine is pushed through the diaphragm defect and into the chest portion. These internal tissues 32 and associated configuration within the surgical simulator replicate DH. An external tissue 36 then covers the rib cage 28 and internal tissue 32 (see FIG. 34) and the surgical simulator 20 is ready for a surgical procedure (see FIG. 35).

The above example is only one of many possibilities for internal tissue. Internal tissue of the simulator may replicate any anatomy of a newborn or neonatal infant and the internal tissue may be made of a variety of different materials.

Additionally, the internal tissue may be secured in place within the simulator in a variety of manners.

In one example, the internal tissue 32 may be made from animal tissue such as, for example, fetal porcine or fetal bovine mediastinal blocks (e.g., heart, lungs, trachea, esophagus, aorta, liver, stomach, spleen, etc.). This animal tissue may be surgically modified to recreate anatomy of a newborn infant (e.g., recreate EA/TEF anatomy, DH anatomy, or other anatomy in either the chest or abdomen, or anatomy in both the chest and abdomen). The internal tissue 32 may be secured in place or properly positioned in the rib cage 28 in a variety of manners. For example, the internal tissue may be coupled to one or both of the rib cage 28 and the base 24. More particularly, the internal tissue 32 may be coupled to one or both of the rib cage 28 and base 24 by, but not limited to, elastic members, clips, snaps, eye-hooks, fasteners, hook-and-loop type fasteners, pins, compression caused by forcing the internal tissue into a portion of one or both of the rib cage 28 and base 24 that is slightly smaller than the internal tissue, thereby applying a compression force to the internal tissue and inhibiting the internal tissue from moving. Also, for example, the base 24 may include a receptacle 40 adapted to receive a portion of the internal tissue 32 therein and inhibit the internal tissue 32 from moving.

Another example of internal tissue 32 and assembly of the internal tissue 32 with the surgical simulator 20 will be described as it relates to EA/TEF. In this example, a second trimester fetal bovine mediastinal tissue (e.g., heart, lungs, aorta, trachea and esophagus in a single tissue block) is used. This example relates to the most common variant of EA/TEF, which is proximal esophageal atresia with distal tracheoesophageal fistula. However, other variants of EA/TEF are possible as well. The esophagus is transected at a level of the carina and purse-string sutured to the posterior carina. The proximal esophagus is shortened about one centimeter and then purse-string closed. The esophageal "gap" is approximately two centimeters. Other variations of EA/TEF can be created, including proximal and distal fistulae to the trachea, proximal and distal atresia without fistulae, long "gap" or short "gap" atresia, and any other variations of the same. This internal tissue 32 is then secured to the base 24 and the rib cage 28 is seated around the internal tissue 32. The entire apparatus is then covered by external tissue 36 (e.g., silicone or other synthetic rubber skin) (see FIG. 34) and is ready for a surgical procedure (see FIG. 35). This example of internal issue 32 may be utilized with the surgical simulator 20 illustrated in FIG. 13.

Figure 34:
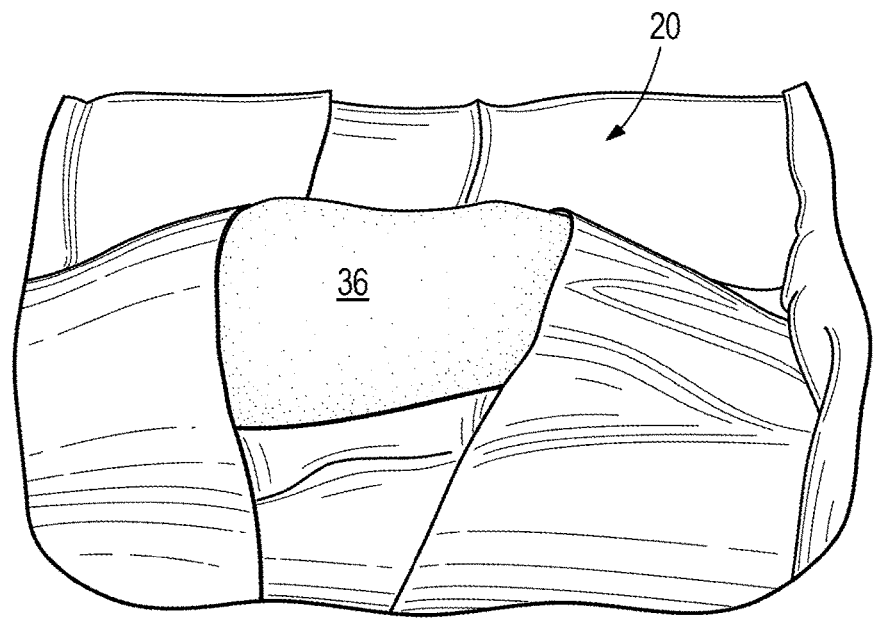
FIG. 34 is an isometric view of an example of an external tissue covering an example of a surgical simulator, according to one aspect of the present disclosure.
Figure 35:
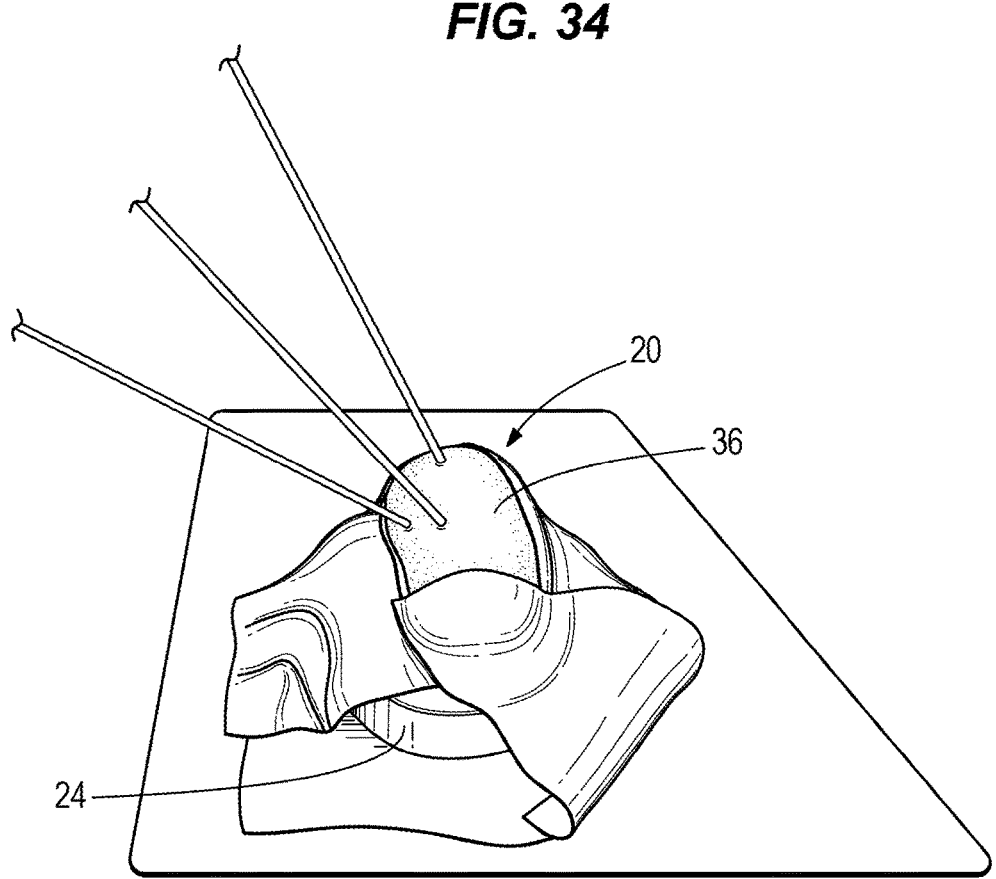
FIG. 35 is an isomeric view of an example of a surgical simulator being utilized to perform an example of a surgical procedure, according to one aspect of the present disclosure.

With particular reference to FIGS. 34 and 35, the simulator 20 may include external tissue 36 to replicate skin of a newborn infant. The external tissue 36 may be made of a variety of different materials and may be a variety of different thicknesses. In one example, the external tissue 36 may be about 0.25 inches thick and may be made of silicone. The external tissue 36 may be secured in place in a variety of manners such as, for example, coupled to the rib cage 28, the base 24, both the rib cage 28 and the base 24, a support structure upon which the simulator rests, or any other possibility. In one example, the external tissue 36 may be coupled to the rib cage 28 with an elastic member such as, for example, a rubber band. In another example, a thoracic shaped mold is provided to form the external tissue 36 to the proper dimensions. Dimensions of the mold are based on the measurements used to design the rib cage 28 to closely complement the resulting formed external tissue 36 to the size and shape of the rib cage 28. The external tissue mold may be made of a variety of different materials in a variety of different manners such as, for example, a 3D printer. The external tissue 36 may be made of ECOFLEX® 00-30 Platinum-cured silicone rubber pigmented using SILC-PIG® to Caucasian skin color which is poured into the mold and allowed to cure for 4 hours. The external tissue 36 is then removed from the mold, and may be dusted with baby powder in preparation of assembly with the rib cage 28. The formed external tissue 36 may be coupled to one or both of the rib cage 28 and the base 24, or to the support structure upon which the simulator 20 rests, in a variety of manners such as, but not limited to, an elastic member, clips, snaps, fasteners, hook-and-loop type fasteners, elasticity caused by the stretching of the external tissue 36 over the rib cage 28, or any other manner.

The simulator 20 also provides the ability to position the simulator 20 in a variety of positions. Exemplary positions includes, but are not limited to, true lateral position, semi prone position, prone position, semi recumbent/supine position, and supine position. Surgical procedures may occur in any of these positions and the simulator 20 provides the ability to practice surgical procedures in any of these positions.

With continued reference to FIGS. 1-8, the surgical simulator 20 further includes a tissue stabilizer 76 adapted to stabilize one or more of internal tissue 32 and external tissue 36, and a selectively removable pelvis member 80 adapted to replicate a pelvis of a newborn infant.

The tissue stabilizer 76 may be adapted to stabilize and/or support internal tissue 32 positioned within the rib cage 28, external tissue 36 coupled to an exterior of the rib cage 28, or both internal and external tissue 32, 36. The tissue stabilizer 76 includes a first portion 76A and a second portion 76B adapted to selectively couple together and selectively couple to a support member 84, which ultimately couples to the base 24. The support member 84 may rest upon the base or be introduced into the base 24 prior to curing of the material used to make the base 24 and then be secured to the base 24 when the material cures. In other examples, the support member 84 may be friction-fit, press-fit, or interference-fit into a receptacle or aperture defined in the base 24. The first portion 76A includes a plurality of projections or teeth 88 and the second portion 76B includes a plurality of apertures 92 that may be aligned with and receive the projections 88 therein. Tissue 32, 36 may be secured between the first and second portions 76A, 76B of the tissue stabilizer 76.

The removable pelvis member 80 may be selectively coupled to and uncoupled from the rib cage 28 as desired. The removable pelvis member 80 may be selectively coupled to the rib cage 28 in a variety of manners. In the illustrated example, the pelvis member 80 includes a projection 96 and the rib cage 28 defines an aperture 100 adapted to receive the projection 96. The projection 96 and aperture 100 interaction may be any one of, but not limited to, a snap-fit, a friction-fit, an interference-fit, etc. The pelvis member 80 also includes a pelvis support member 104 adapted to couple the pelvis member 80 to the base 24. In one example, the support member 104 rests on or engages the base 24. In another example, the support member 104 inserts into an aperture or receptacle defined in the base 24. In a further example, the support member 104 is configured to rest on a surface upon which the simulator is positioned.

Figure 10:
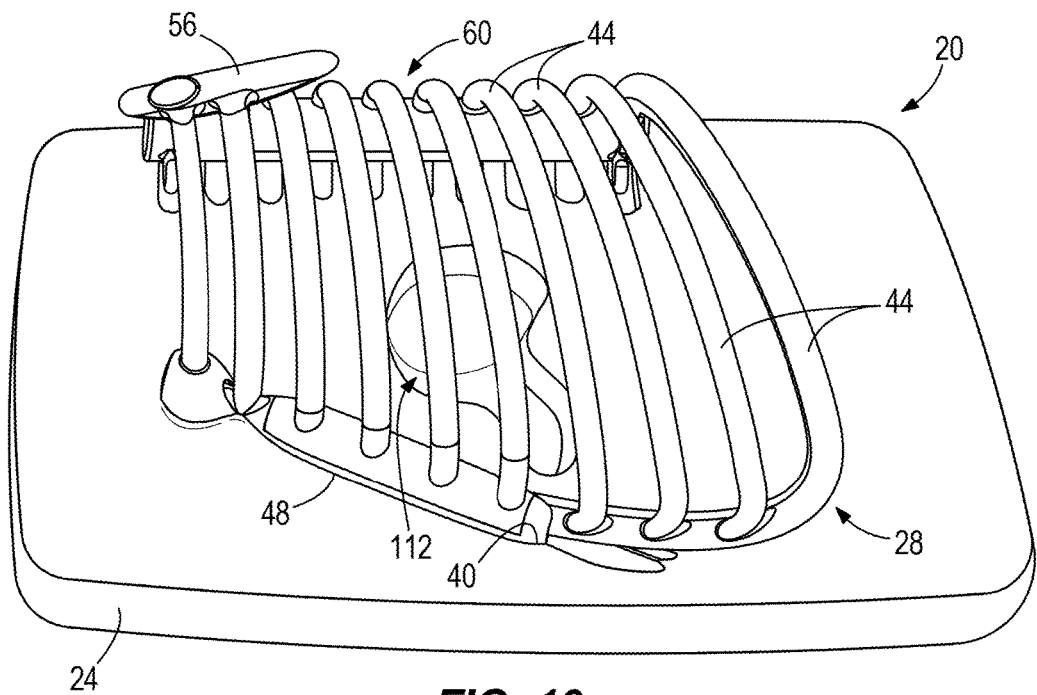
FIG. 10 is an isometric view of the simulator shown in FIG. 9 supported by a base, according to one aspect of the present disclosure.
Figure 11:
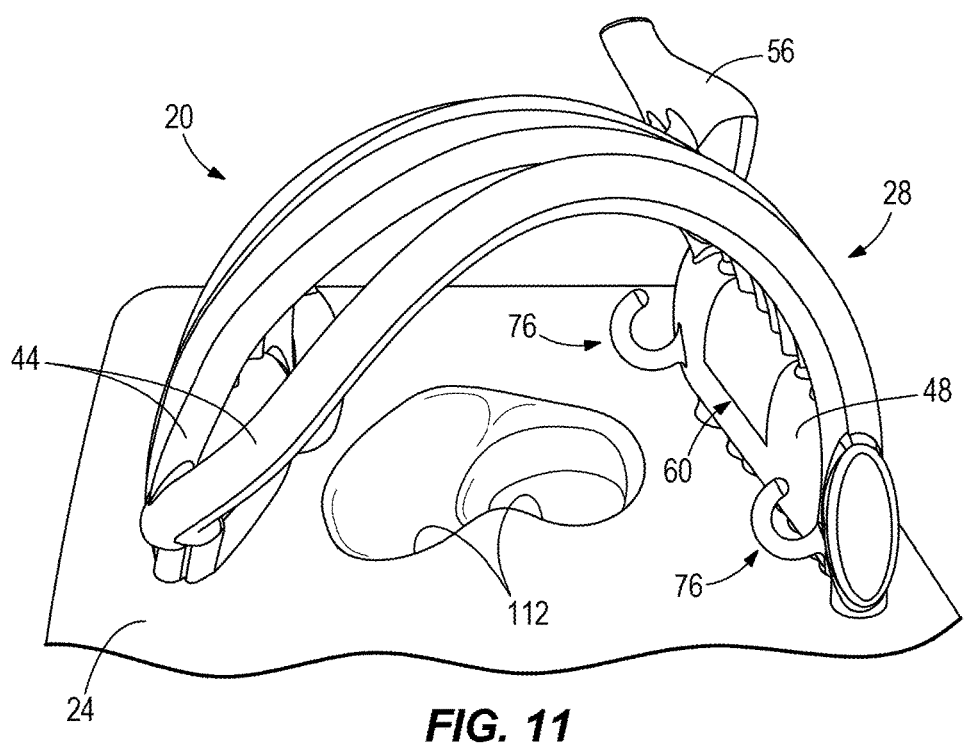
FIG. 11 is an isometric view of the simulator and base shown in FIG. 10, according to one aspect of the present disclosure.
Figure 12:
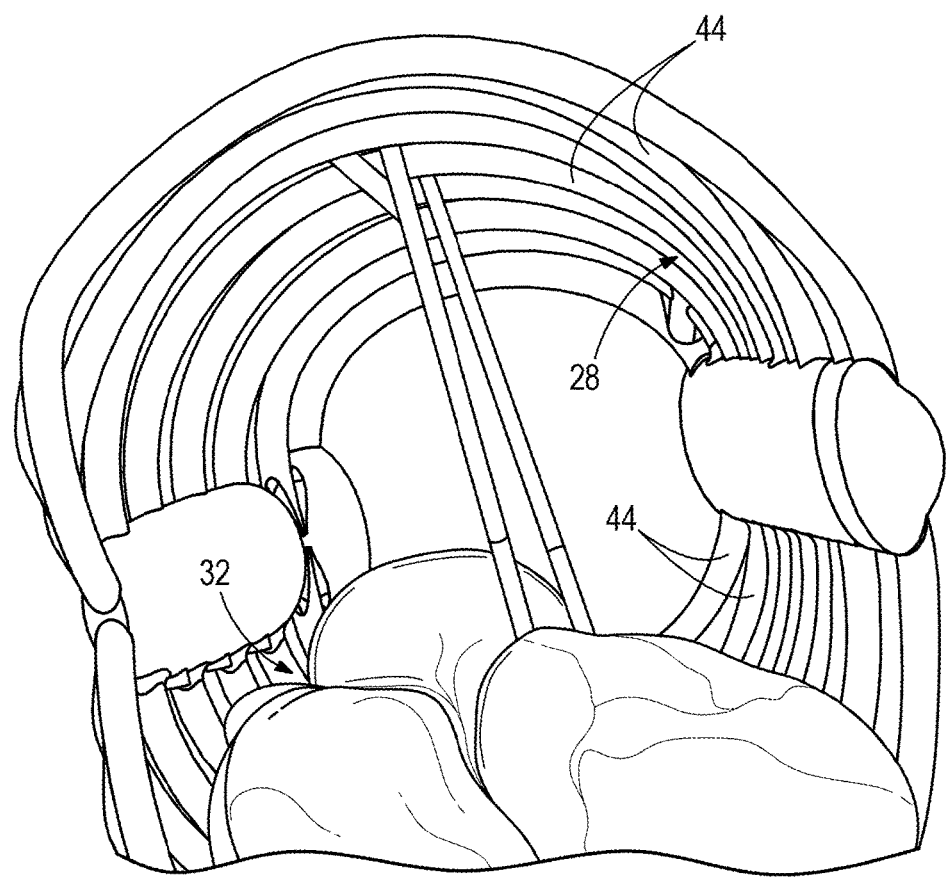
FIG. 12 is an isometric of an interior of the simulator shown in FIG. 9 with real or biologic internal tissue positioned in the simulator and surgical tools performing a surgical procedure, according to one aspect of the present disclosure.

Referring now to FIGS. 9-12, the second example of the surgical simulator 20 is illustrated and will be described in more detail. This surgical simulator 20 replicates the left side of a neonate rib cage and may be utilized to perform various surgical procedures. One example of a surgical procedure includes a lobectomy. The simulator 20 includes a removable portion 60 similar to the example illustrated in FIGS. 1-8 and a support member 84 adapted to assist with coupling the simulator 20 to a base 24. The simulator 20 further includes a tissue stabilizer 76 adapted to stabilize and/or support internal tissue 32 positioned within the rib cage 28, external tissue 36 coupled to an exterior of the rib cage 28, or both internal and external tissue 32, 36. In this example, the tissue stabilizer 76 has a different configuration than the tissue stabilizer 76 illustrated in FIGS. 1-8. In this example, with respect to FIG. 10, the tissue stabilizer may compress or otherwise retain tissue against other portions of the simulator 20. With reference to FIG. 11, a further example of a tissue stabilizer 76 is illustrated. In this example, the tissue stabilizer 76 includes a plurality of hooks adapted to engage internal tissue 32 (see FIG. 12) positioned within the rib cage 28. The illustrated example includes two hooks, however, it should be understood that the tissue stabilizer 76 may include any number of hooks (including one) and be within the intended spirit and scope of the present disclosure. With particular reference to FIGS. 10 and 11, the base 24 of the simulator 20 defines a cavity or receptacle 112 therein adapted to receive internal tissue 32 (see FIG. 12) that will be positioned inside the rib cage 28 and upon which a surgical procedure will be performed.

Referring now to FIGS. 13-19, the third example of the surgical simulator 20 is illustrated and will be described in more detail. This surgical simulator 20 replicates the right side of a neonate rib cage and may be utilized to perform various surgical procedures. One example of a surgical procedure includes an esophageal atresia with tracheoesophageal fistula repair (EA/TEF). The EA/TEF procedure is predominantly performed in the right side of the rib cage, which is why this simulator 20 can be used for the EA/TEF repair. The simulator 20 includes a removable portion 60 similar to the examples illustrated in FIGS. 1-12 and a support member 84 adapted to assist with coupling the simulator 20 to a base 24. This simulator 20 may, for example, utilize internal tissue 32 comprising the anatomy requiring repair in an EA/TEF procedure. This internal tissue 32 may be real tissue or synthetic tissue. In examples where the EA/TEF material is real or biologic (e.g., see FIG. 16), the EA/TEF anatomy may include, but is not limited to, proximal esophagus ends in a blind pouch, distal esophagus attached to the posterior trachea at the level of the carina, a esophageal tube, a proximal pouch, etc. In one example, a carina/fistula may be located at an origin of a fifth rib of the rib cage 28 and a consistent esophageal gap of about 15-20 mm may be established.

With continued reference to FIGS. 13-19, the simulator 20 may include internal tissue that is synthetic. The following example of synthetic tissue is only one example of synthetic tissue and is not intended to limit the present disclosure. Rather, the simulator 20 is capable of including a wide variety of synthetic tissues made in a wide variety of different manners, and allow of such possibilities are intended to be within the spirit and scope of the present disclosure.

Figure 13:
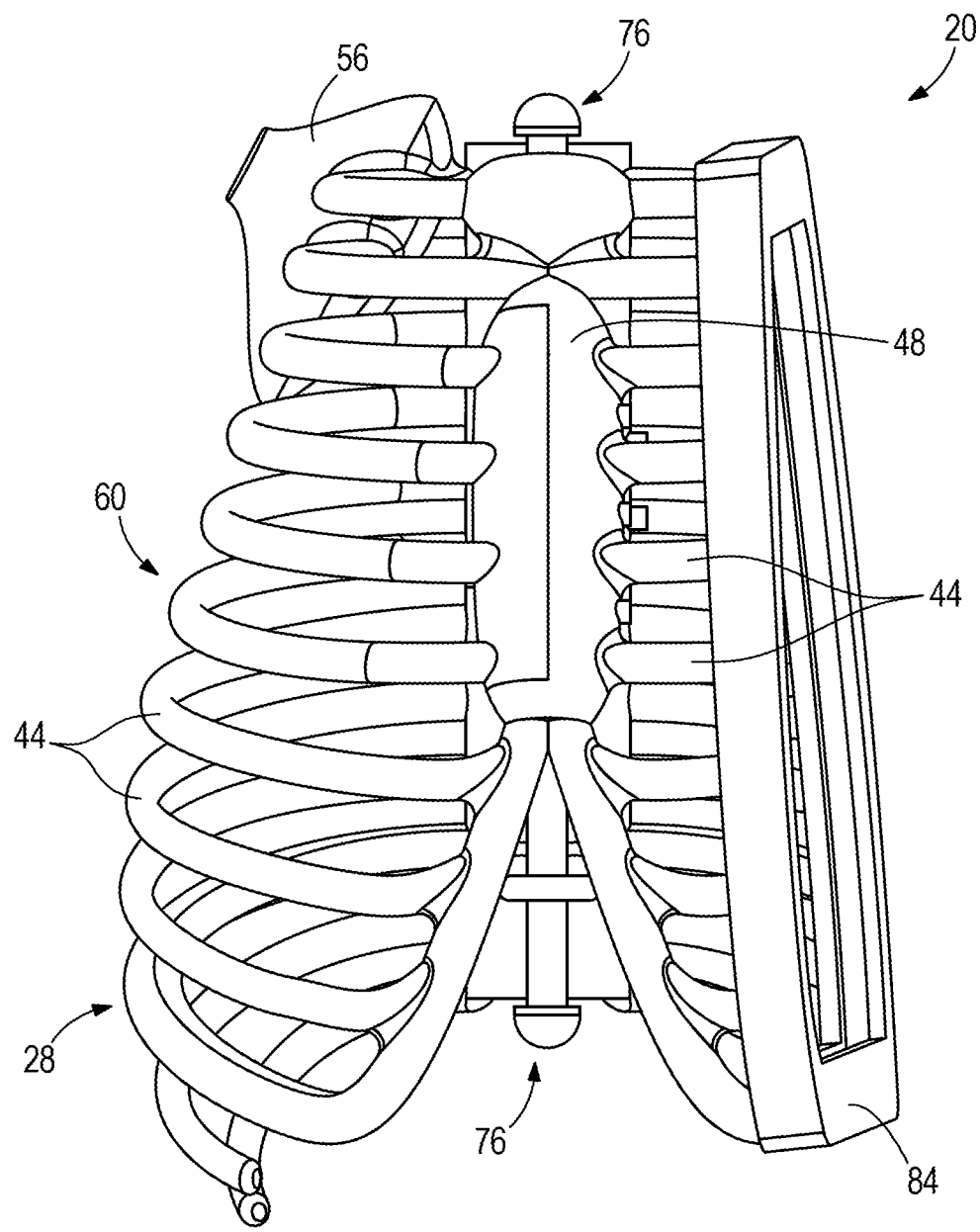
FIG. 13 is an isometric view of a further example of a surgical simulator with the simulator adapted to include a base, in this example the simulator may be used for esophageal atresia with tracheoesophageal fistula repair, according to one aspect of the present disclosure.
Figure 14:
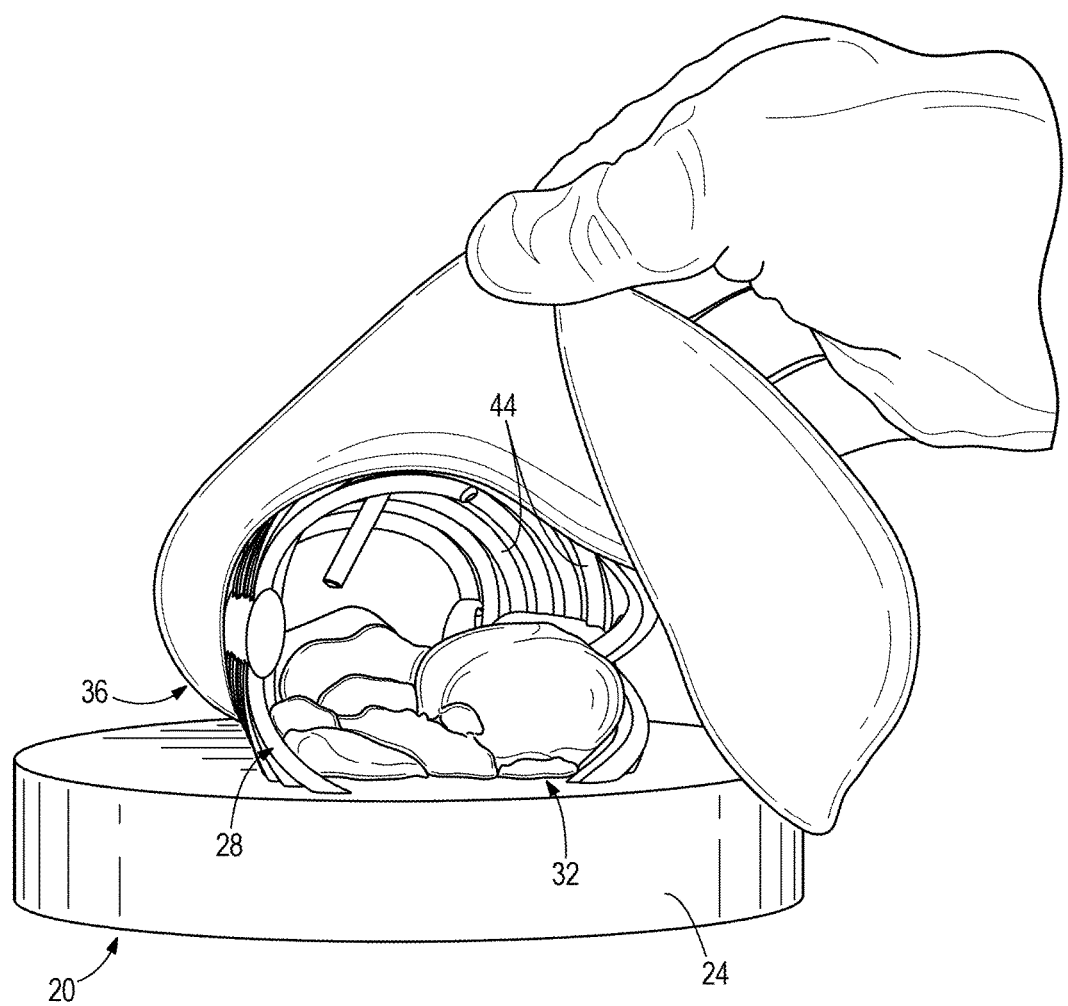
FIG. 14 is an isometric view of the simulator shown in FIG. 13 with real or biologic internal tissue positioned in the simulator and synthetic external tissue over the simulator, according to one aspect of the present disclosure.
Figure 16:
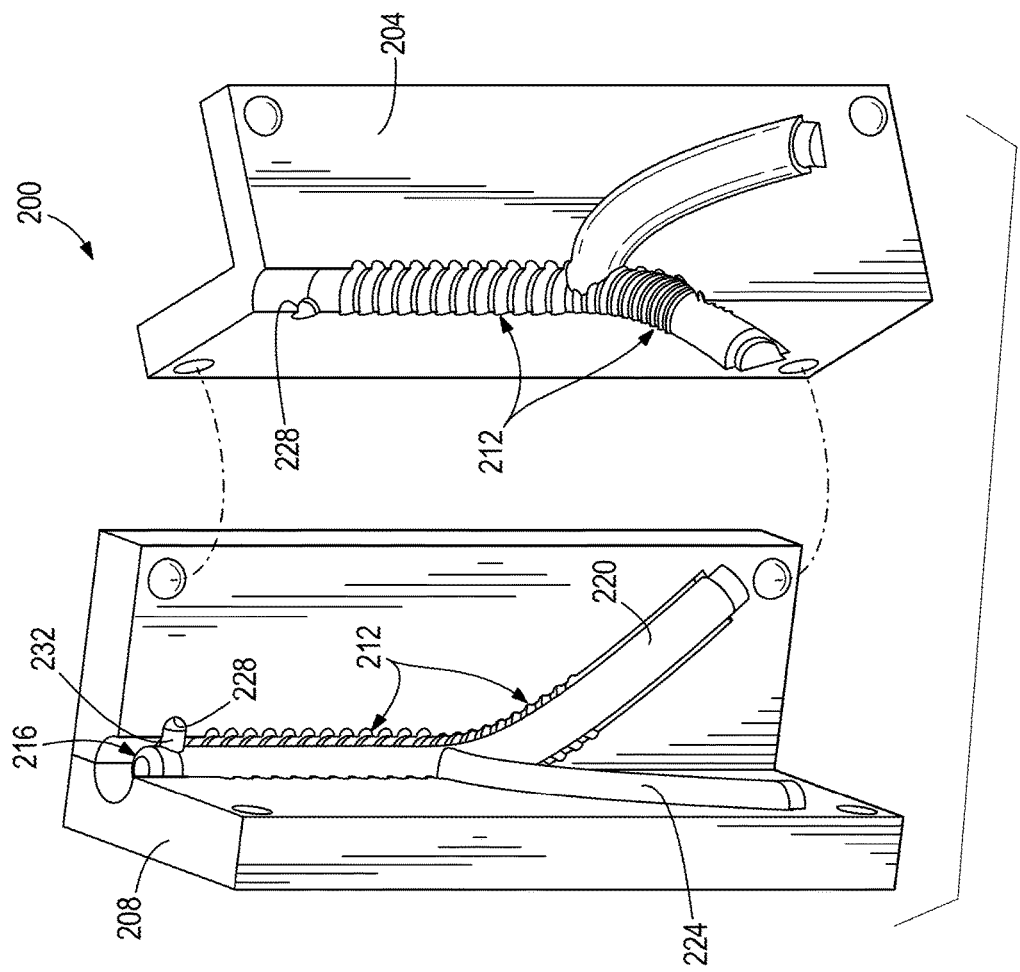
FIG. 16 is an exploded view of the mold shown in FIG. 15, according to one aspect of the present disclosure.
Figure 15:
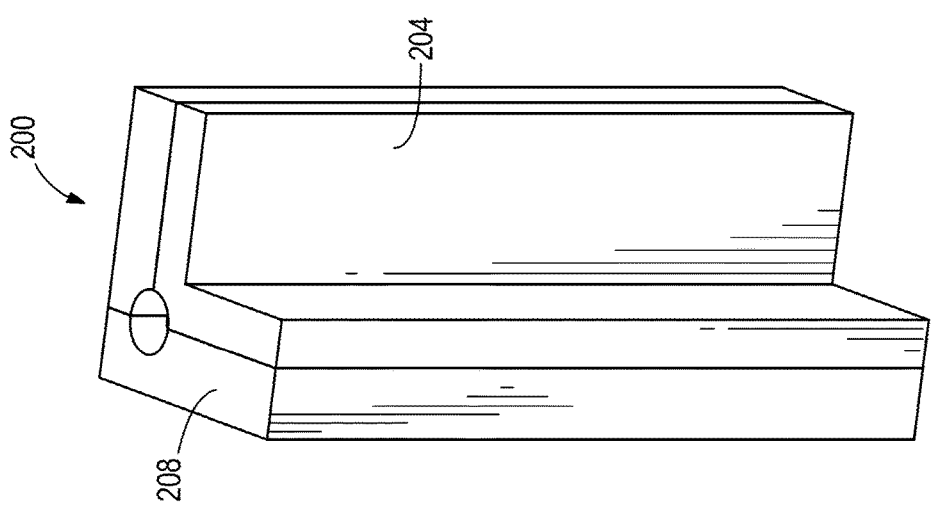
FIG. 15 is an isometric view of one example of a mold adapted to be used to manufacture one example of synthetic internal tissue to be used in a simulator, for example the simulator shown in FIG. 13, according to one aspect of the present disclosure.
Figure 17:
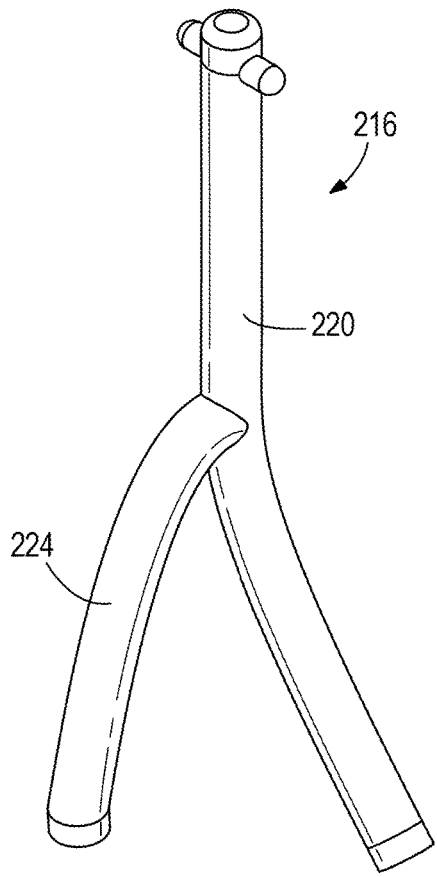
FIG. 17 is an isometric view of a portion of the mold shown in FIG. 15, according to one aspect of the present disclosure.
Figure 18:
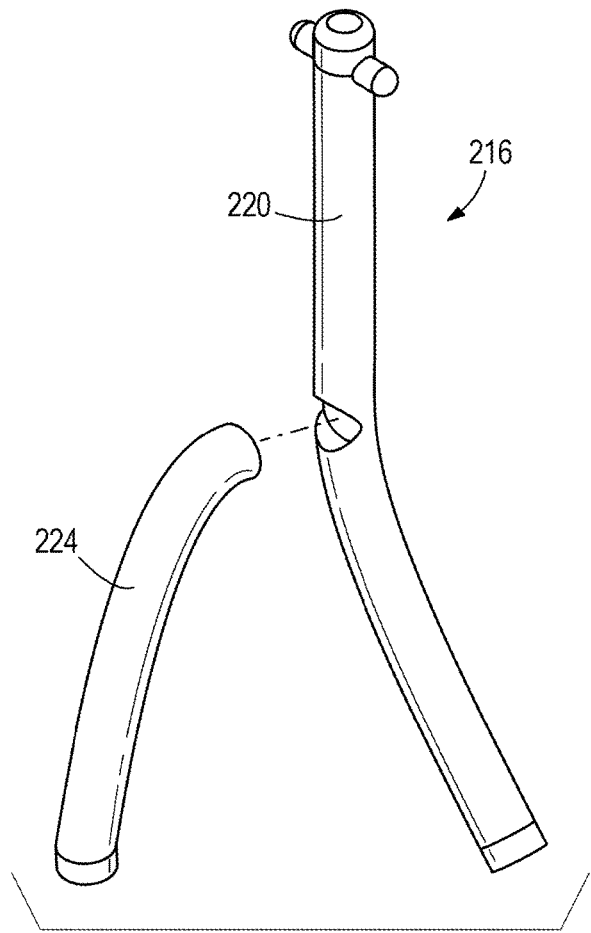
FIG. 18 is an exploded view of the portion of the mold shown in FIG. 17, according to one aspect of the present disclosure.
Figure 19:
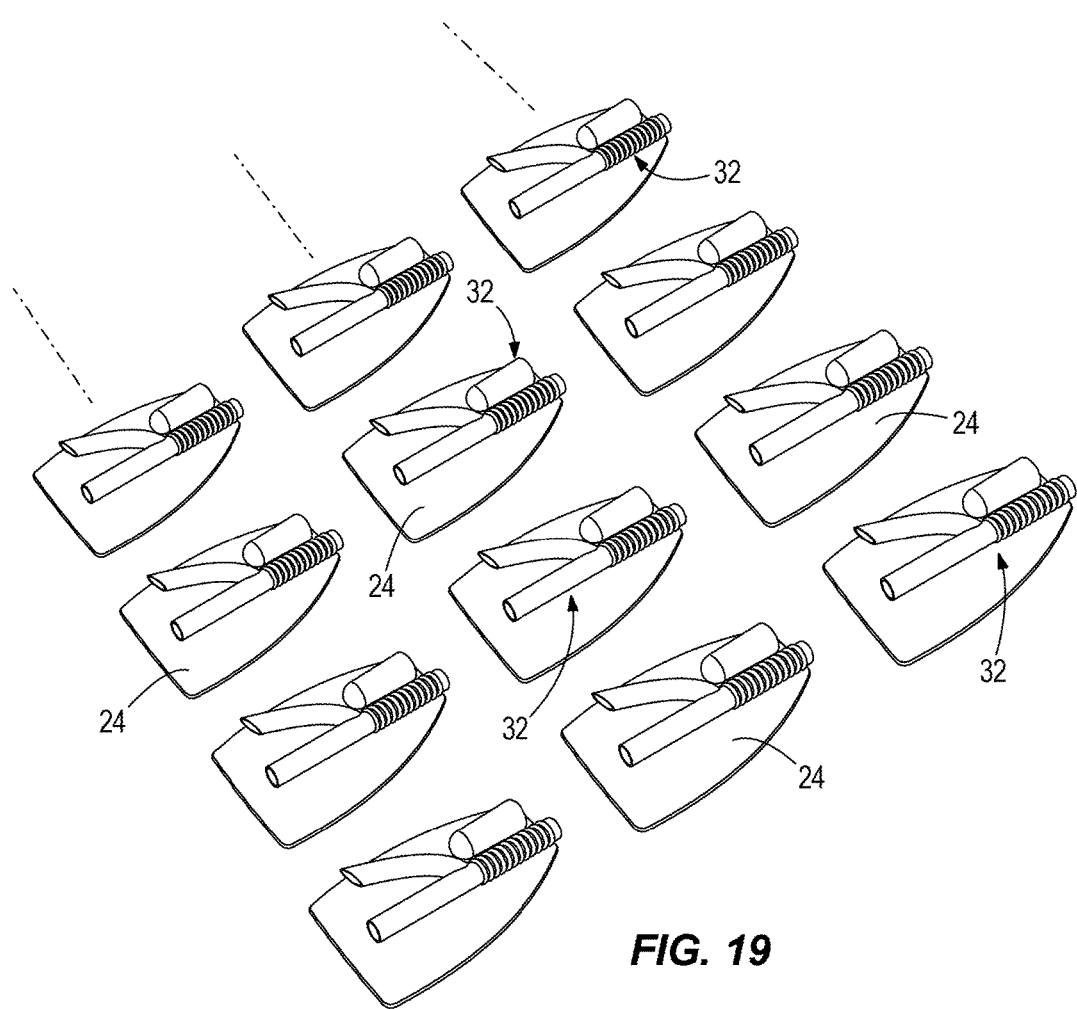
FIG. 19 is an isometric view of a plurality of sets of synthetic internal tissue, at least some of which are created by the mold shown in FIG. 15, to be positioned in a simulator, for example the simulator shown in FIG. 13, according to one aspect of the present disclosure.
Figure 20:
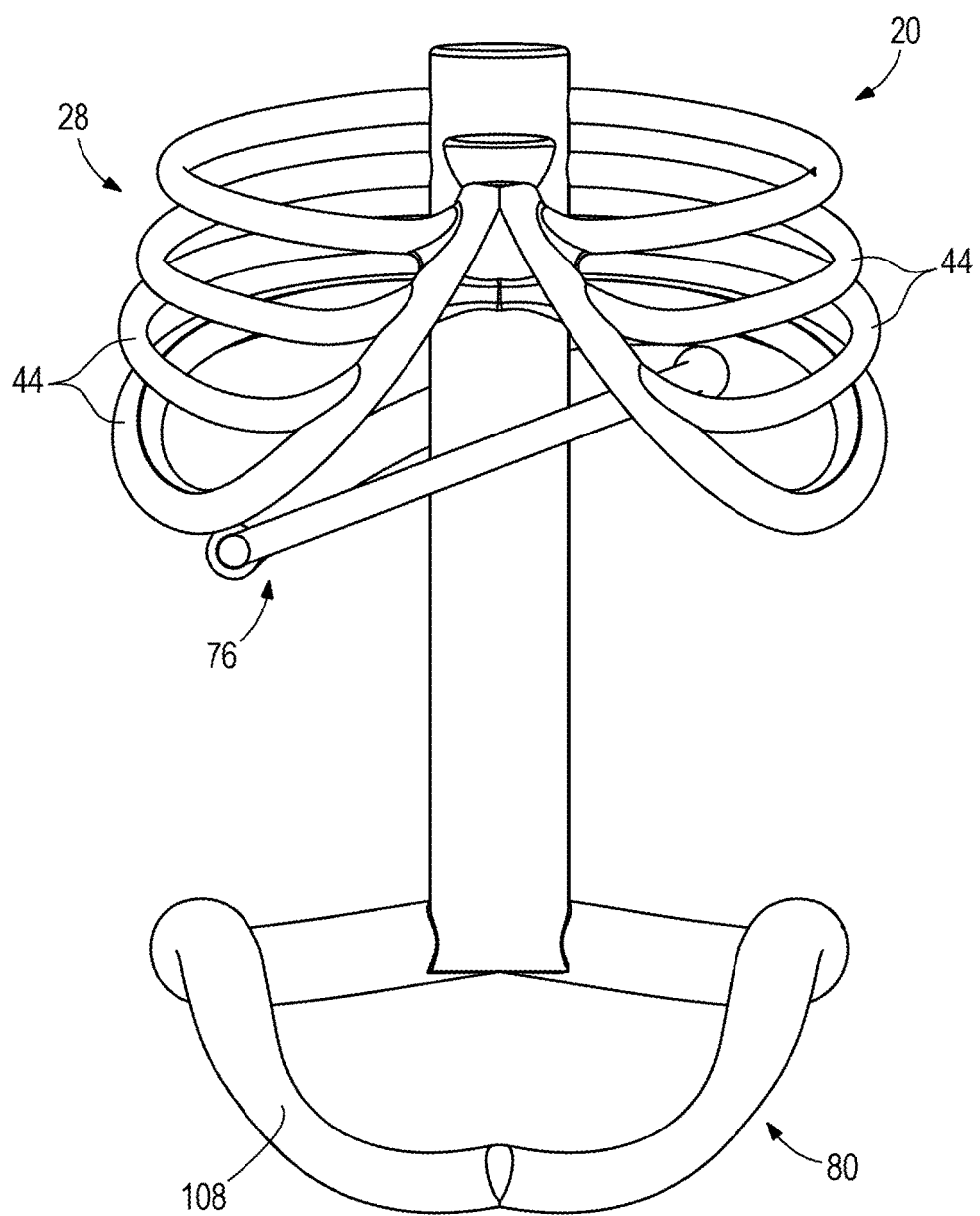
FIG. 20 is a top view of still another example of a surgical simulator with the simulator adapted to include a base, in this example the simulator may be used for duodenal atresia repair, according to one aspect of the present disclosure.
Figure 22:
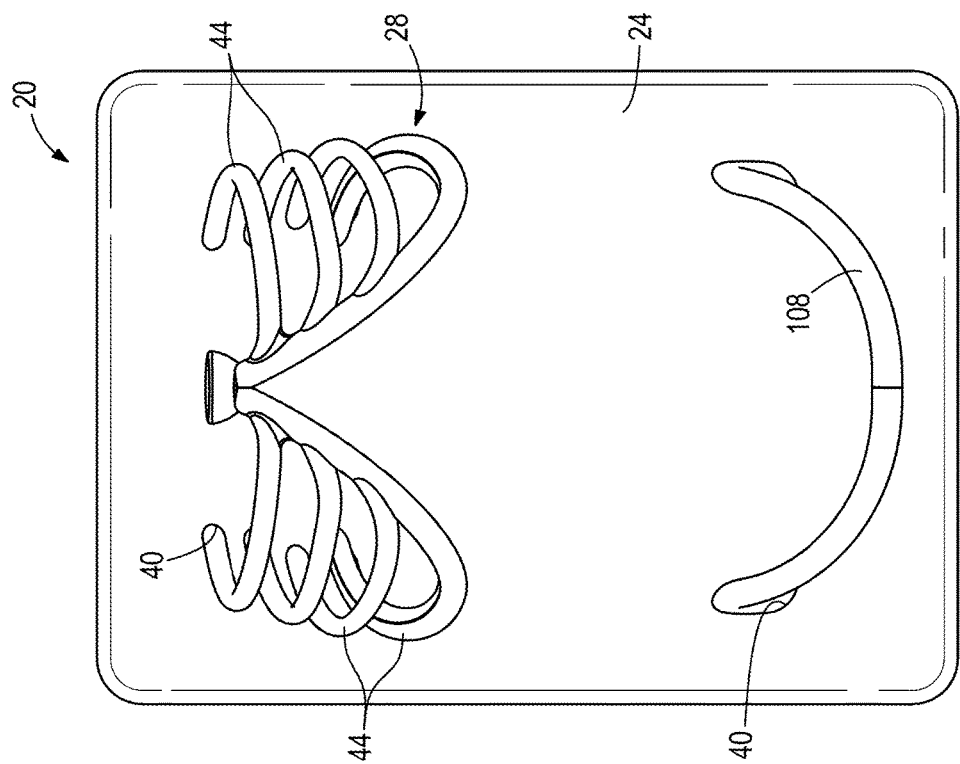
FIG. 22 is a top view of either one of the surgical simulators shown in FIGS. 20 and 21 coupled to the base, according to one aspect of the present disclosure.
Figure 21:
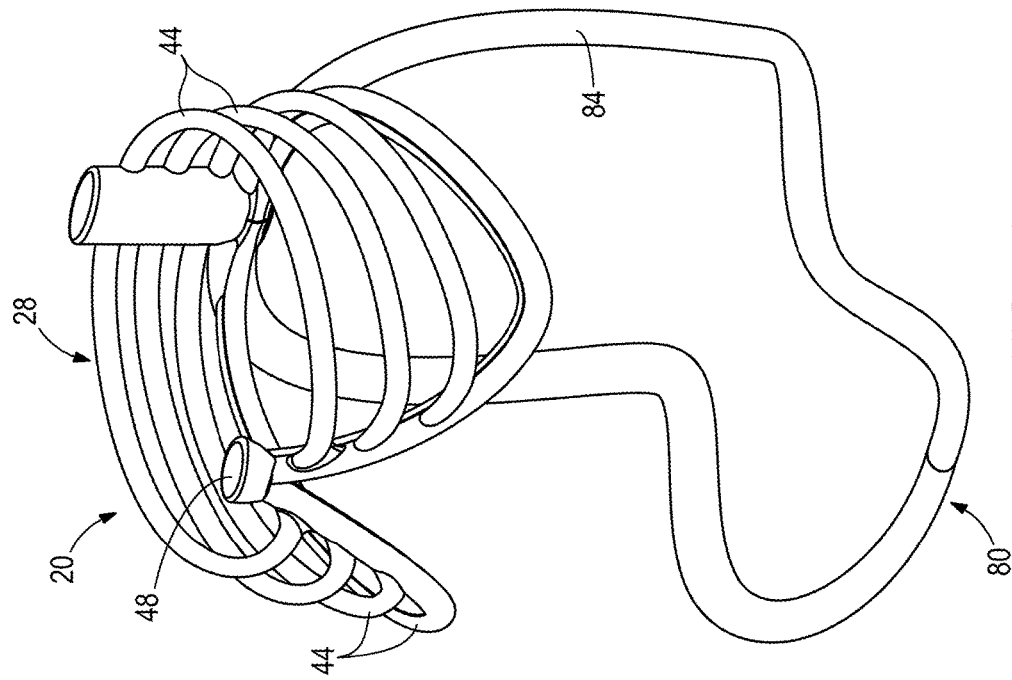
FIG. 21 is an isometric view of yet another example of a surgical simulator with the simulator adapted to include a base, in this example the simulator may be used for duodenal atresia repair, according to one aspect of the present disclosure.

The synthetic material is configured to be positioned in and work with the simulator illustrated FIG. 13 and may also be positioned in and work with other simulators. The simulator 20 includes three portions: One portion simulating an atresia of a proximal esophagus; a second portion simulating a fistula between a distal esophagus and trachea; and a thin silicone sheet base as a third portion. To ensure adequate dimensions of the portions of the synthetic material, CT scans from term neonates may be measured to determine accurate diameters for at least the esophagus and trachea. In some examples, two separate portions 204, 208 of a mold 200 are utilized to create at least some of the synthetic internal tissue 32. For example, one portion of the mold 200 is used to form the atresia of the proximal esophagus and another portion of the mold forms the fistula between the distal esophagus and trachea (see FIGS. 15-18). The mold 200 is configured to provide a thin-walled and hollow synthetic internal tissue, and include inner and outer components 212 to form lumens of the trachea and esophagus. In some examples, the mold 200 may be made by 3D printing in high performance composite material. The portions of the mold 200 may be sanded smooth for precise fitting. The mold 200 may include a third portion 216 positioned in the first and second portions 204, 208 to ensure the synthetic internal material is hollow. The third portion 216 may include a plurality of components 220, 224 coupled together (see FIG. 18). The mold 200 may include a first key feature 228 (e.g., a projection or a recess) in one of the first and second portions 204, 208 and the third portion 216 may include a complementary second key feature 232 (e.g., the other of a projection or recess to that of the first key feature) that interacts with the first key feature 228 to properly orient the third portion 216 relative to the first and second portions 204, 208 of the mold 200.

To form synthetic internal tissue, flesh colored silicone rubber (any possible color of flesh or other colors) are poured into a completely assembled mold 200 (i.e., the two mold portions coupled together—see FIG. 15) and allowed to cure. In addition to the EA/TEF anatomy, the synthetic internal tissue may include a lung. In some examples, such a synthetic lung may present more complete anatomy within the thoracic cavity of the simulator. The synthetic lung may be made in a variety of manners and all of such possibilities are intended to be within the spirit and scope of the present disclosure. The example disclosed herein is not intended to be limiting upon the present disclosure. In one example, a mold for the lung may be formed by hand out of clay or other appropriate material. Synthetic material used for the lung may be poured into the mold and allowed to cure. Silicone tubing threaded with wire may be used to couple the synthetic lung to the remainder of the simulator 20. The synthetic EA/TEF anatomy may be coupled to a thin silicone sheet using a silicone gel adhesive (see FIG. 19). A gap may be provided between the proximal and distal esophagus. In some examples, the synthetic internal tissue may be coupled to the base 24. In one example, pins such as, for example, T-pins may be used. In one example, the synthetic lung may be coupled to the base by threading silicone tubing through the trachea and pinning it to the base. The rib cage portion of the simulator is placed over the synthetic internal tissue and coupled to the base. External tissue may then be applied over the rib cage to cover the rib case.

Figure 23:
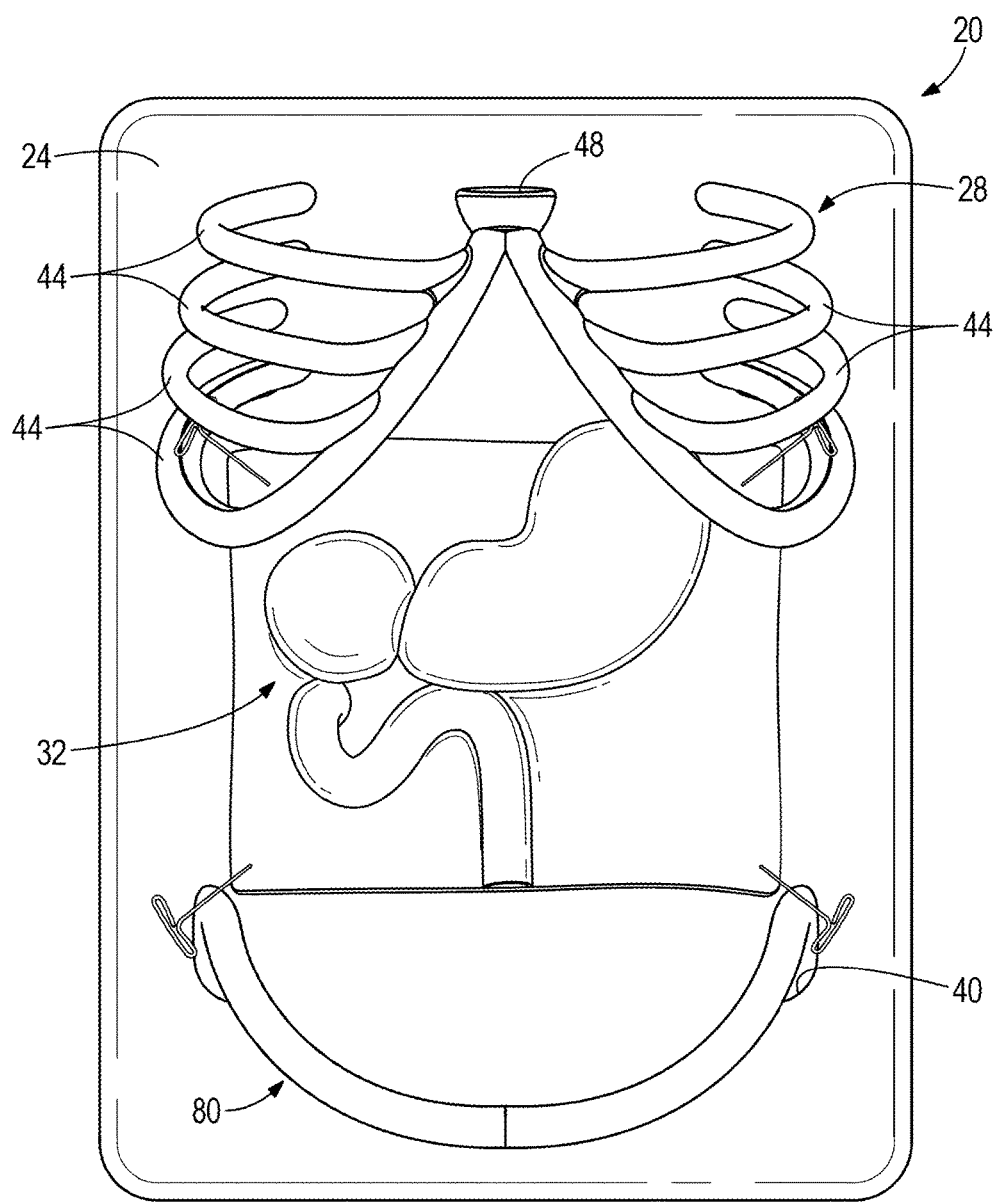
FIG. 23 is a top view of either one of the surgical simulators shown in FIGS. 20 and 21 coupled to a base and including synthetic internal tissue, according to one aspect of the present disclosure.
Figure 24:
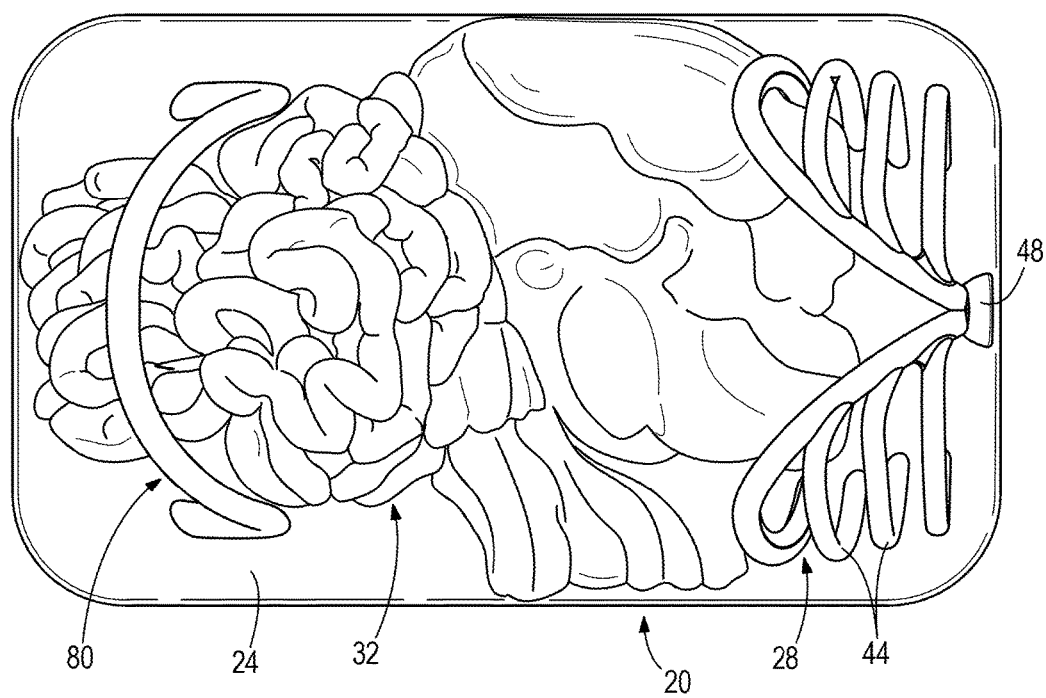
FIG. 24 is a top view of either one of the surgical simulators shown in FIGS. 20 and 21 coupled to a base and FIG. 25 is an isometric view of either one of the surgical simulators shown in FIGS. 20 and 21 coupled to a base and including synthetic external tissue covering the simulator, according to one aspect of the present disclosure.
Figure 25:
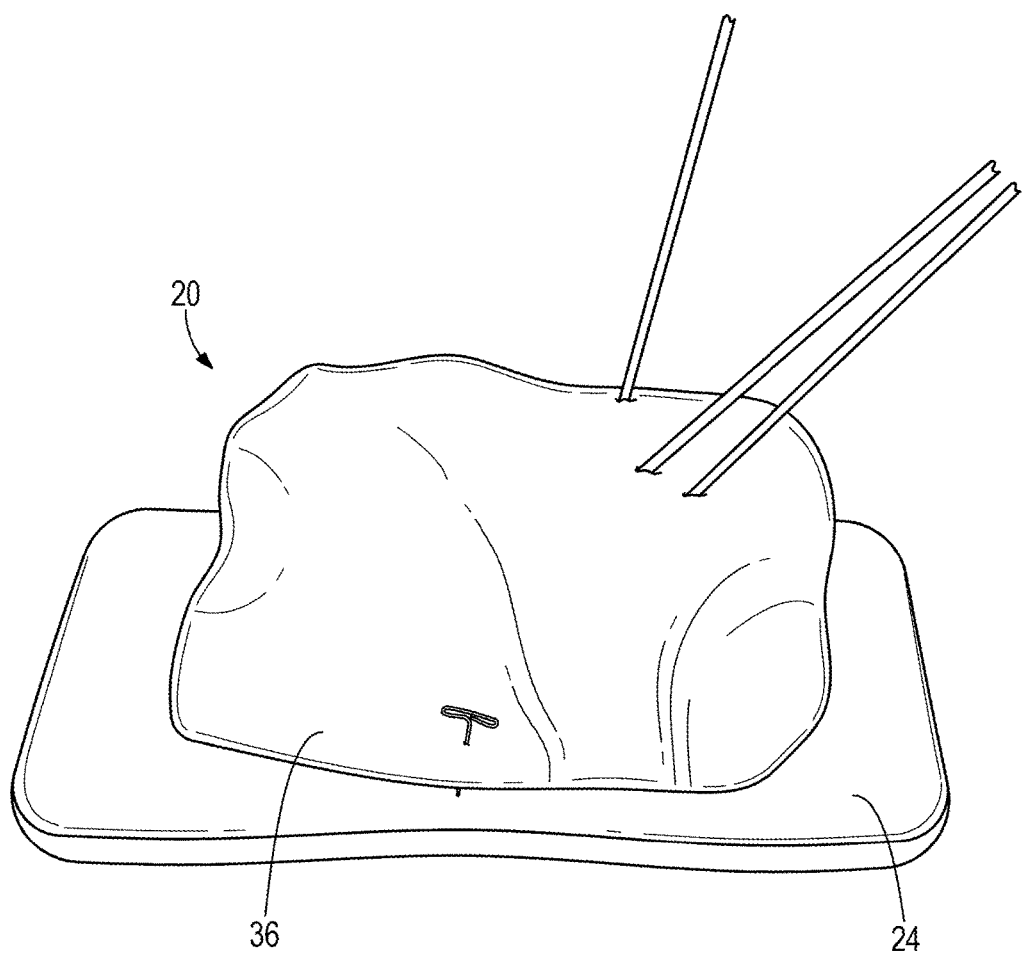

Referring now to FIGS. 20-27, the fourth example of the surgical simulator 20 is illustrated and will be described in more detail. This surgical simulator 20 replicates the bottom four ribs and pelvis of a neonate and may be utilized to perform various surgical procedures. One example of a surgical procedure includes duodenal atresia (DA) repair. In one example, the simulator 20 may include a removable chest portion 60 and a removable pelvis portion 108. These removable portions may be replaced if damaged, worn, or broke. Like at least some of the other simulators disclosed herein, this simulator includes a base 24. This base 24 is adapted to support both the rib cage 28 and the pelvis member 80. This simulator 20 may, for example, utilize internal tissue 32 comprising the anatomy requiring repair in a DA repair procedure. This internal tissue 32 may be real tissue or synthetic tissue. With particular reference to FIG. 24, one example of real internal tissue required to perform a DA repair procedure is illustrated.

With reference to FIG. 23, one example of synthetic internal tissue required to perform a DA repair procedure is illustrated. The following example of synthetic tissue is only one example of synthetic tissue and is not intended to limit the present disclosure. Rather, the simulator 20 is capable of including a wide variety of synthetic tissues made in a wide variety of different manners, and allow of such possibilities are intended to be within the spirit and scope of the present disclosure.

The thoracic and abdominal cavity of the simulator 20 illustrated in FIG. 23 is adapted to replicate that of any size neonate, infant, or otherwise young baby. In order to accurately simulate an abdominal domain as is required for the DA repair procedure, the simulator 20 includes a pelvis. The anterior and lateral borders of a neonatal pelvis may be formed by taking direct measurements of the pelvis of neonates' pelvises with computed tomography (CT) scan. In some examples, the simulator may be printed in ABS plastic on a 3D fused deposition-modeling (FDM) printed and, in some examples, may take approximately 16 hours to print. The simulator 20 may also include external tissue covering the rib cage 28.

In some examples, CT scans were taken of neonates to determine accurate dimensions of the anatomy (i.e., synthetic internal tissue) associated with DA repair. In one example, a mold is used to form the synthetic internal tissue required for DA repair. The mold may be thin-walled and hollow, thereby requiring inner and outer components to create the necessary structures. In one example, wall thickness of the mold may be about 1.5 mm for all segments of the mold. In one example, the mold may be 3D printed in high performance composite material. The mold may be sanded smooth to assist with fitting of various parts of the mold (i.e., if the mold is comprised of multiple parts). Pigmented synthetic material may be poured into the mold and allowed to cure. The synthetic material may be a wide variety of types of synthetic material and all of such possibilities are intended to be within the spirit and scope of the present invention. In one example, the synthetic material may be pigmented silicone rubber. In this example, the pigmented silicone rubber may cure in about two hours.

In one example, with reference to FIG. 23, the synthetic internal tissue may then be coupled to a thin synthetic material sheet using an adhesive such as, for example, a silicone gel adhesive. The assembled synthetic internal tissue and the synthetic sheet then may be coupled to the base in a wide variety of manners. In one example, the synthetic internal tissue and the synthetic sheet may be coupled to the base using pins such as, for example, T-pins. External tissue may then be placed over the rib cage 28 of the simulator 20 and secured in place.

Another example of a surgical procedure that may be performed using the simulator illustrated in FIGS. 20-27 includes gastrostomy tube (GT) placement. Gastrostomy tube placement occurs in the abdomen, which is why the simulator shown in FIGS. 20 and 21 may be utilized to perform this procedure. The simulator includes the bottom four ribs of a neonate rib cage, a spine and pelvis to complete the relevant portion of the abdominal cavity. The simulator is capable of using real or synthetic external tissue. In some examples utilizing synthetic external tissue, the synthetic external tissue may be a skin covering having about a 4 mm thickness and may be made of a high performance composite material, any other synthetic material described herein, or any other appropriate synthetic material. In some examples, such as that illustrated in FIG. 22-24, the rib cage and pelvis may be placed into the base before the base cures in order to couple or secure the rib cage and pelvis to the base. This manner of coupling or securing the rib cage and any other portion of the simulator to a base may apply to any of the simulators described herein. Apertures or cutouts may be formed in the base 24 to receive and support various internal tissues that will be positioned in the simulator.

Figure 26:
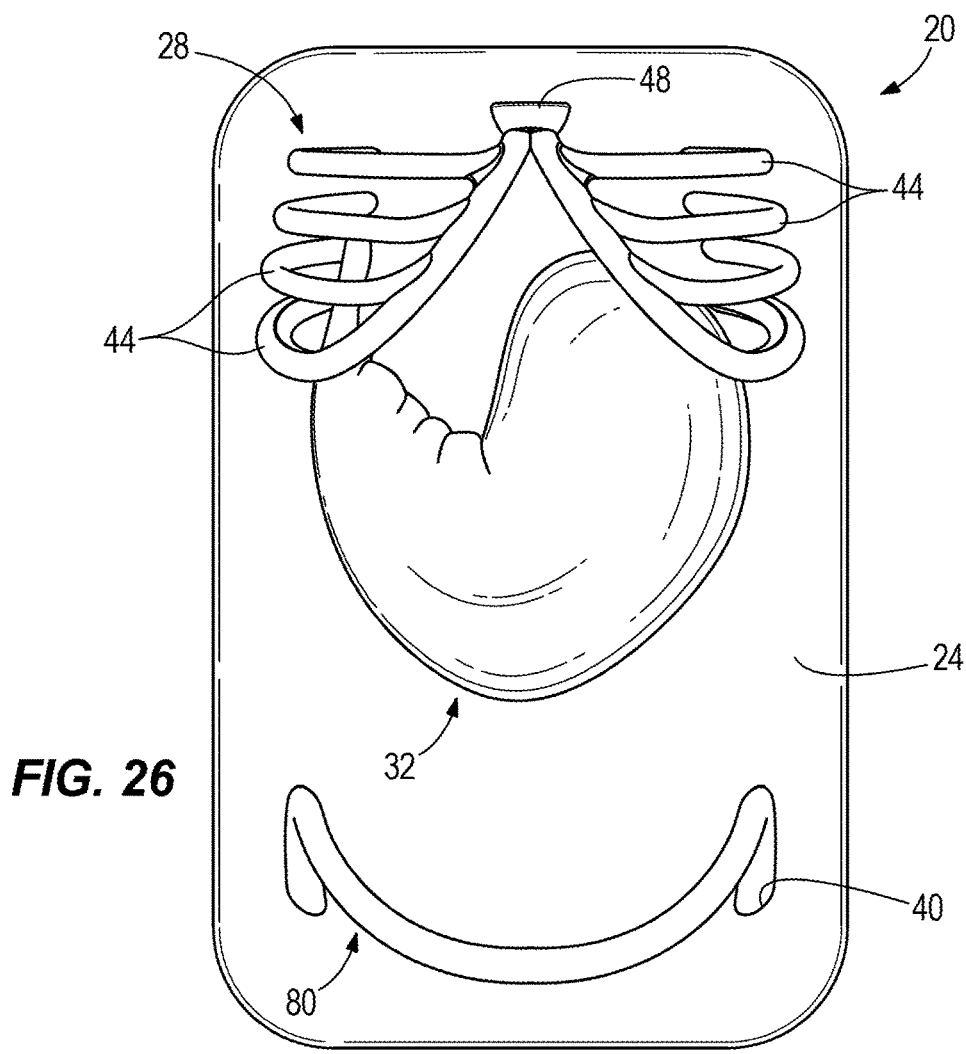
FIG. 26 is a top view of either one of the simulators shown in FIGS. 20 and 21 including internal tissue appropriate for performing gastrostomy tube placement, according to one aspect of the present disclosure.
Figure 27:
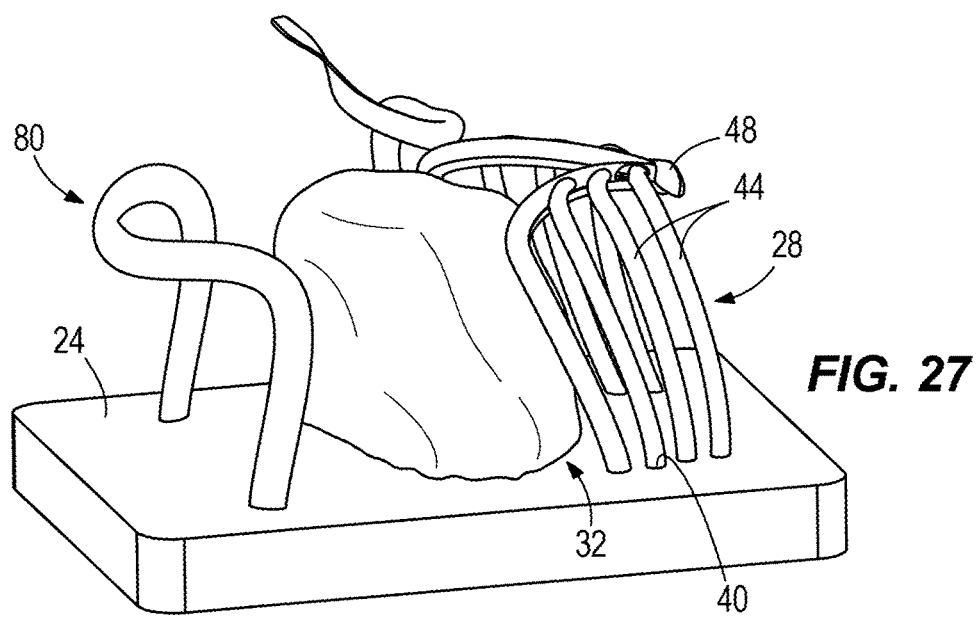
FIG. 27 is an isometric view of the simulator shown in FIG. 26 during while a gastrostomy tube placement procedure is being performed, according to one aspect of the present disclosure.

Referring to FIGS. 26 and 27, the simulator for performing GT placement may include internal tissue comprised of a synthetic stomach of a neonate. In this example, the stomach is made to accommodate a gastrostomy tube and may have a thickness of about 2 mm. The stomach may be made of any synthetic material described herein or any other appropriate synthetic material. In some examples, a mold may be used to manufacture the stomach. In some examples, the mold may be a two-part mold made of platinum cured silicone. In some examples, dark red-tinted silicone may be poured into the mold and cured for approximately 2 hours. Extension tubing may be routed to allow air to be pushed into the stomach for inflation. The stomach may then be coupled to the base inside the rib cage as illustrated in FIG. 26. The stomach may be inflated either by the tubing, with a syringe, or both.

Referring now to FIG. 28, the fifth example of the surgical simulator 20 is illustrated and will be described in more detail. This surgical simulator 20 replicates the right side of a neonate rib cage and may be utilized to perform various surgical procedures. This simulator 20 is similar in structure to the simulator illustrated in FIGS. 13-19, but this simulator 20 is illustrated with a base 24. In this illustrated example, the base 24 is generally circular in shape. In other examples, the base 24 is generally rectangular in shape. It should be understood that the base 24 may have any shape and size, and is adapted to support the rib cage 28 and any other components attached to the rib cage 28 in one or more positions.

Referring now to FIG. 29, the sixth example of the surgical simulator 20 is illustrated and will be described in more detail. This surgical simulator 20 replicates the right side of a neonate rib cage and may be utilized to perform various surgical procedures. This simulator 20 is similar in structure to the simulators illustrated in FIGS. 13 and 26, but has a slightly different configuration of the rib cage 28. As described above, the simulator 20 may have any size, shape, and configuration, and all of such possibilities are intended to be within the spirit and scope of the present disclosure.

Referring now to FIG. 30, the seventh example of the surgical simulator 20 is illustrated and will be described in more detail. This surgical simulator 20 replicates an entire neonate rib cage and may be utilized to perform various surgical procedures. The rib cage 28 is supported on a base 24 defining a receptacle 40 for receiving and supporting the rib cage 28. Internal tissue 32 is positioned and supported in the rib cage 28.

As indicated above, the surgical simulators of the present disclosure may replicate various portions of the newborn infant anatomy. For example, other examples of surgical simulators may replicate an abdomen of a newborn infant. As indicated above, newborn infants may have a variety of different sizes and shapes associated with different percentiles of the infants. Thus, the abdominal simulator may have a variety of different sizes and shapes to accommodate different size newborn infants. Additionally, such abdominal simulators may include a base 24, internal tissue 32 and external tissue 36, which will all be configured to complement the abdominal anatomy of a newborn infant. The base 24, internal tissue 32 and external tissue 36 may all have features and characteristics associated with the base, internal tissue and external tissue described elsewhere in the present disclosure, or may have unique features and characteristics. All of such possibilities are intended to be within the spirit and scope of the present disclosure.

A plurality of examples of surgical procedures capable of being performed with the surgical simulators disclosed herein will now be presented. The steps included in the following examples of surgical procedures, the examples of simulators associated with the examples of surgical procedures, and the manners in which the surgical simulators are utilized are not intended to be limiting upon the present disclosure. Rather, the surgical simulators may be used in different manners, the simulators may be used with different surgical procedures, and the surgical procedures may include more, less, or different steps, and all of such possibilities are intended to be within the spirit and scope of the present disclosure.

A first example of a surgical procedure that may be conducted with one or more of the surgical simulators of the present disclosure includes esophageal atresia/tracheoesophageal fistula repair, which is a congenital anomaly. One example of a simulator with which this surgical procedure may be performed is the simulator illustrated in FIGS. 13-19. This general surgical procedure encompasses all variations of this anomaly. Such variations include, for example, proximal atresia with distal fistula, pure atresia, proximal fistula with distal atresia, proximal and distal fistulae, and H or N type fistulae. This general surgical procedure also encompasses all surgical approaches through the chest and/or neck such as, for example, thoracoscopic—using minimally invasive techniques to repair, open (traditional approach) thoracotomy, hybrid operation (using both minimally invasive and open techniques for repair), and robotic. This surgical procedure utilizes the rib cage 28, stabilizing base 24 and insert. The simulator may also include a neck structure for H/N type fistulae repair. The simulator is covered by external tissue such as, for example, silicon or other synthetic skin. This surgical procedure could be created as a closed system (i.e., air tight chest and skin) to allow for insufflation to be used in the minimally invasive approach. If specific tasks within the surgical procedure, and not the entire surgical procedure, are to be taught/practiced, the surgical simulator may use plastic or other composite materials to simulate the anatomic variations. Such specific tasks within the overall surgical procedure may include, for example, intracorporeal suturing techniques, trocar or incision placement, etc. If the entire surgical procedure is to be taught/practiced, the surgical simulator may utilize biologic internal tissues that may be surgically modified into specific anatomic variations of anatomy, thereby recreating all key components of the surgical procedure. Current examples of tissue used may be second trimester fetal bovine mediastinal block (e.g., heart, lung, larynx, trachea, esophagus and aorta). Additionally, any other biologic tissue that is size appropriate for the surgical simulator may be used such as, for example, fetal porcine, chicken, rabbit, etc. An esophageal tube may be used in the surgical simulator to assist in identification of esophagus and confirmation of patency of anastomosis. An endotracheal tube with or without lung ventilation may be used in the surgical simulator to recreate more realistic challenges associated with anesthesia. A bronchoscope may be utilized to evaluate the trachea prior to initiating repair.

A second example of a surgical procedure that may be conducted with one or more of the surgical simulators of the present disclosure includes diaphragmatic hernia or eventration repair, which is a congenital anomaly. One example of a simulator with which this surgical procedure may be performed is the simulator illustrated in FIGS. 1-8. This general surgical procedure encompasses all variations of the anatomy such as, for example, right or left side diaphragmatic hernia, Morgagni hernia (central chest), small defect appropriate for primary closure, large defect appropriate for patch repair, and eventration of the diaphragm in left and/or right chest. This general surgical procedure also encompasses all surgical approaches to repair, for example, thoracoscopic or laparoscopic repair, trans-thoracic open repair, trans-abdominal open repair, and robotic. In this surgical procedure, the surgical simulator may include a rib cage 28, a stabilizing base 24 and insert, an abdominal extension of the chest to include an abdominal domain, a rib insert for stabilization and standardization of the diaphragm/hernia defect. The surgical simulator also includes external tissue such as, for example, silicon or other synthetic skin, to cover the rib cage 28. This surgical procedure could be created as a closed system (i.e., air tight chest, abdomen, pelvis and skin) to allow for insufflation to be used in the minimally invasive approaches. To teach specific tasks or portions of the surgical procedure, the surgical simulator may include plastic or other non-biologic composite materials to simulate the anatomic variations. For example, the diaphragm may be silicon composite, the intestines may also be silicon composite, or they may be some other material that may be more realistic. Exemplary specific tasks or portions of the procedure may include intracorporeal suturing techniques, trocar or incision placement, etc. To teach the entire surgical procedure or to provide a more realistic experience, the surgical simulator may include biologic tissue that may or may not be surgically modified into specific anatomic variations to recreate all key components of the surgical procedure. Exemplary biologic tissue may include second trimester fetal bovine diaphragm and intestine. Any other tissue that is size appropriate for the surgical simulator may be used such as, for example, fetal porcine, chicken, rabbit, etc. The surgical simulator for this surgical procedure may also include full abdominal tissue block including, for example, liver, stomach, spleen, pancreas, intestine, etc. A variety of devices may be used to execute this surgical procedure such as a variety of adjunct endomechanical devices including, but not limited to, tissue sealing devices, clips, biopsy devices, tissue staplers, suture, etc. Additionally, an endotracheal tube with or without lung ventilation may be used to recreate more realistic challenges associated with anesthesia.

A third example of a surgical procedure that may be conducted with one or more of the surgical simulators of the present disclosure includes lung/mediastinal biopsy, which is a congenital anomaly. This general surgical procedure encompasses all variations of anatomy such as, for example, large or small lesions in peripheral lung, large or small lesions in central lung, Hilar lesions (near pulmonary vessels and heart), and mediastinal lesions (near central vessels, trachea and heart). This general surgical procedure also encompasses all surgical approaches through the chest such as, for example, thoracoscopic (using minimally invasive techniques to repair), open (traditional approach) thoracotomy, hybrid operation (using both minimally invasive and open techniques for repair), and robotic. The surgical simulator useable with this surgical procedure may include a rib cage 28, a stabilizing base 24 and insert, and external tissue (e.g., silicon or other synthetic skin) covering the rib cage 28. The surgical simulator may be created as a closed system (i.e., air tight chest and skin) to allow for insufflation to be used in the minimally invasive approach. In instances where specific tasks within or portions of the surgical procedure are to be taught/practiced, the surgical simulator may include plastic or other composite materials to simulate the anatomic variations. Exemplary tasks within or portion of the surgical procedure may include, for example, core or wedge biopsy, trocar or incision placement, etc. In instances where the entire surgical procedure is to be taught/practiced or if a more realistic experience is desired, the surgical simulator may include biologic tissue that may or may not be surgically modified into specific anatomic variations, thereby recreating all key components of the surgical procedure. Exemplary biologic tissues useable with the surgical simulator include, but are not limited to, second trimester fetal bovine mediastinal block (e.g., heart, lung, larynx, trachea, esophagus and aorta). Additionally, other materials appropriately sized and shaped with the surgical simulator may be used and include, for example, fetal porcine, chicken, rabbit, etc. A variety of endomechanical devices may be used to execute this surgical procedure. Exemplary devices include, but are not limited to, tissue sealing devices, clips, biopsy devices, tissue staplers, suture, etc. Additionally, an esophageal tube may be used in the surgical simulator to assist in identification of the esophagus. Further, an endotracheal tube with or without lung ventilation may be used in the surgical simulator to recreate more realistic challenges associated with anesthesia. Moreover, a bronchoscope may be used in the surgical procedure to evaluate the trachea/bronchi prior to or during the surgical procedure.

A fourth example of a surgical procedure that may be conducted with one or more of the surgical simulators of the present disclosure includes lobectomy, which repairs congenital anomalies. One example of a simulator with which this surgical procedure may be performed is the simulator illustrated in FIGS. 9-12. This general surgical procedure encompasses all variations of pediatric pathology such as, for example, congenital lobar emphysema, cystic adenomatoid pulmonary malformation, sequestration, combined pulmonary malformations, and other congenital malformations. The surgical simulator may include any and all lobes in the right and/or left chest. This general surgical procedure also encompasses all surgical approaches through the chest such as, for example, thoracoscopic (using minimally invasive techniques to repair), open (traditional approach) thoracotomy, hybrid operation (using both minimally invasive and open techniques for repair), and robotic. The surgical simulator associated with this surgical procedure may include a rib cage 28, a stabilizing base 24 and insert, and external tissue (e.g., silicon or other synthetic skin) covering the rib cage 28. The surgical simulator may be created as a closed system (i.e., air tight chest and skin) to allow for insufflation to be used in the minimally invasive approach. In instances where specific tasks within or portions of the surgical procedure are to be taught/practiced, the surgical simulator may include plastic or other composite materials to simulate the anatomic variations (e.g., correct anatomy, trocar or incision placement, etc.). In instances where the entire surgical procedure is to be taught/practiced or if a more realistic experience is desired, the surgical simulator may include biologic tissue that may or may not be surgically modified into specific anatomic variations, thereby recreating all key components of the procedure. Exemplary biologic tissue may include, but is not limited to, second trimester fetal bovine mediastinal block (e.g., heart, lung, larynx, trachea, esophagus and aorta). In one example, the biologic tissue may be prepared with injection of a blood substitute into pulmonary vessels via selective dissection and ligation of the patent ductus arteriosa, the left pulmonary artery, and the left pulmonary vein. In other examples, the biologic tissue may be any other tissue that is size appropriate for the surgical simulator such as, for example, fetal porcine, chicken, rabbit, etc. A variety of endomechanical devices may be used to execute this surgical procedure. Examiner devices include, but are not limited to, tissue sealing devices, biopsy devices, tissue staplers, clips, suture, etc. The surgical simulator may include an esophageal tube to assist in identification of esophagus. An endotracheal tube with or without lung ventilation may be used to recreate more realistic challenges associated with anesthesia. A bronchoscope may be used to evaluate the trachea/bronchi prior to or during the surgical procedure.

A fifth example of a surgical procedure that may be conducted with one or more of the surgical simulators of the present disclosure includes esophagectomy or esophageal myotomy, which repair a congenital anomaly. One example of a simulator with which this surgical procedure may be performed is the simulator illustrated in FIGS. 13-19. This general surgical procedure encompasses all variations of pediatric pathology such as, for example, achalasia (not congenital), esophageal stenosis, esophageal stricture, esophageal duplication, and other congenital lesions of the esophagus. This surgical structure also encompasses all surgical approaches through the chest such as, for example, thoracoscopic (using minimally invasive techniques to repair), open (traditional approach) thoracotomy, hybrid operation (using both minimally invasive and open techniques for repair), and robotic. The surgical simulator associated with this surgical procedure may include a rib cage 28, a stabilizing base 24 and insert, and external tissue (e.g., silicon or other synthetic skin) to cover the rib cage 28. The surgical simulator may be created as a closed system (i.e., air tight chest and skin) to allow for insufflation to be used in the minimally invasive approach. In instances where specific tasks within or portions of the surgical procedure are to be taught/practiced, the surgical simulator may use plastic or other composite materials to simulate the anatomic variations (e.g., correct anatomy, trocar or incision placement, etc.). In instances where the entire surgical procedure is to be taught/practiced or if a more realistic experience is desired, the surgical simulator may use biologic tissue that may or may not be surgically modified into specific anatomic variations, thereby recreating all key components of the surgical procedure. Exemplary biologic tissue that may be used includes, but is not limited to, second trimester fetal bovine mediastinal block (e.g., heart, lung, larynx, trachea, esophagus and aorta). The surgical simulator may use any other tissue that is size appropriate for the surgical simulator such as, for example, fetal porcine, chicken, rabbit, etc.). A variety of endomechanical devices may be utilized to execute the surgical procedure. Examples of devices may include, but are not limited to, tissue sealing devices, biopsy devices, tissue staplers, clips, suture, etc. An esophageal tube may be used to assist in identification of esophagus. Also, an esophageal endoscopy may also be used. An endotracheal tube with or without lung ventilation may be used to recreate more realistic challenges associated with anesthesia.

A sixth example of a surgical procedure that may be conducted with one or more of the surgical simulators of the present disclosure includes aortopexy, which repairs a congenital anomaly. Tracheomalacia is the only current indication and this surgical procedure is able to address any and all lobes in the right or left chest. Thus, the surgical simulator associated with this surgical procedure may include any and all lobes in the right or left chest. This general surgical procedure encompasses all surgical approaches through the chest including, but not limited to, thoracoscopic (using minimally invasive techniques to repair), open (traditional approach) thoracotomy, hybrid operation (using both minimally invasive and open techniques for repair), and robotic. The surgical simulator associated with this surgical procedure may also include a rib cage 28, a stabilizing base 24 and insert, and external tissue (e.g., silicon or other synthetic skin) used to cover the rib cage 28. The surgical simulator could be created as a closed system (i.e., air tight chest and skin) to allow for insufflation to be used in the minimally invasive approach. In instances where specific tasks within or a portion of the surgical procedure are to be taught/practiced, the surgical simulator may include plastic or other composite materials to simulate the anatomic variations such as, for example, correct anatomy, trocar or incision placement, suturing etc. In instances where the entire surgical procedure is to be taught/practiced or when a more realistic experience is desired, the surgical simulator may include biologic tissue that may or may not be surgically modified into specific anatomic variations, thereby recreating all key components of the procedure. Examples of biologic tissue that may be used with the surgical simulator include, but are not limited to, a second trimester fetal bovine mediastinal block (e.g., heart, lung, larynx, trachea, esophagus and aorta). The surgical simulator may utilize any other biologic tissue that is size appropriate for the surgical simulator such as, for example, fetal porcine, chicken, rabbit, etc. The surgical procedure may perform perfusion of heart/aorta to recreate the intraoperative environment. An endotracheal tube with or without lung ventilation may be utilized to recreate more realistic challenges associated with anesthesia. A bronchoscope may be utilized to evaluate the trachea/bronchi prior to, during and/or after the surgical procedure.

A seventh example of a surgical procedure that may be conducted with one or more of the surgical simulators of the present disclosure includes tracheal reconstruction, which repairs a congenital anomaly. This general surgical procedure encompasses all variations of pediatric tracheal pathology such as, for example, bronchial or tracheal stenosis, bronchial or tracheal atresia, endobronchial lesions, and all other congenital anomalies of the trachea and/or bronchi. This general surgical procedure also encompasses all surgical approaches through the neck and/or chest such as, for example, thoracoscopic (using minimally invasive techniques to repair), open (traditional approach) sternotomy or thoracotomy, hybrid operation (using both minimally invasive and open techniques for repair), and robotic. The surgical simulator associated with this surgical procedure may include a rib cage 28, a stabilizing base 24 and insert, variations in the sternum of the rib cage 28 to allow for a median sternotomy, a neck extension for procedures within the proximal trachea, and external tissue (e.g., silicon or other synthetic skin) used to cover the rib cage 28. The surgical simulator may be created as a closed system (i.e., air tight chest and skin) to allow for insufflation to be used in the minimally invasive approach. In instances where specific tasks within or portions of the surgical procedure are to be taught/practiced, the surgical simulator may include plastic or other composite materials to simulate the anatomic variations (e.g., core or wedge biopsy, trocar or incision placement, etc.). In instances where the entire surgical procedure is to be taught/practiced or if a more realistic experience is desired, the surgical simulator may include biologic tissue that may or may not be surgically modified into specific anatomic variations, thereby recreating all key components of the surgical procedure. Examples of biologic tissue include, but are not limited to, second trimester fetal bovine mediastinal block (e.g., heart, lung, larynx, trachea, esophagus and aorta). The surgical simulator may include any other biologic tissue that is size appropriate for the surgical simulator such as, for example, fetal porcine, chicken, rabbit, etc. A variety of endomechanical devices may be utilized to execute this surgical procedure such as, for example, tissue sealing devices, biopsy devices, tissue staplers, clips, suture, etc. An esophageal tube may be used to assist in identification of esophagus. An endotracheal tube with or without selective lung ventilation may be used to recreate more realistic challenges associated with anesthesia. Additionally, this includes transthoracic placement of tracheal tubes. A bronchoscope may be used to evaluate the trachea/bronchi prior to and/or during the surgical procedure.

An eighth example of a surgical procedure that may be conducted with one or more of the surgical simulators of the present disclosure includes cardiac procedures. This general surgical procedure encompasses all congenital cardiac anomalies such as, for example, atria and/or ventricular septal defects, anomalous pulmonary or aortic connections, and other congenital lesions. This general surgical procedure also encompasses all surgical approaches through the chest such as, for example, thoracoscopic (using minimally invasive techniques to repair), open (traditional approach) sternotomy or thoracotomy, hybrid operation (using both minimally invasive and open techniques for repair), and robotic. The surgical simulator associated with this surgical procedure may include a rib cage 28, a stabilizing base 24 and insert, variations in a sternum of the rib cage 28 to allow for a median sternotomy, and external tissue (e.g., silicon or other synthetic skin) used to cover the rib cage 28. The surgical simulator may be created as a closed system (i.e., air tight chest and skin) to allow for insufflation to be used in the minimally invasive approach. In instances where specific tasks within or portions of the surgical procedure are to be performed, the surgical simulator may use plastic or other composite materials to simulate the anatomic variations such as, for example, anatomy identification, suturing, etc. In instances where the entire surgical procedure is to be taught/practiced or if a more realistic experience is desired, the surgical simulator may use biologic tissue that may or may not be surgically modified into specific anatomic variations, thereby recreating all key components of the procedure. Examples of biologic tissue may include second trimester fetal bovine mediastinal block (e.g., heart, lung, larynx, trachea, esophagus and aorta). The surgical simulator may include any other biologic tissue that is size appropriate for the surgical simulator such as, for example, fetal porcine, chicken, rabbit, etc. A variety of endomechanical devices may be used to execute the surgical procedure. Examples of devices include, but are not limited to, tissue sealing devices, biopsy devices, tissue staplers, clips, suture, etc. An endotracheal tube with or without selective lung ventilation may be used to recreate more realistic challenges associated with anesthesia. A transthoracic cardiopulmonary may be used as a bypass circuit.

A ninth example of a surgical procedure that may be conducted with one or more of the surgical simulators of the present disclosure includes thymectomy, which repairs congenital myasthenia gravis. This general surgical procedure encompasses all variations of anatomy such as, for example, lesions within thymus and normal thymus (i.e. myasthenia gravis). This general surgical procedure also encompasses all surgical approaches through the chest such as, for example, thoracoscopic (using minimally invasive techniques to repair), open (traditional approach) thoracotomy, hybrid operation (using both minimally invasive and open techniques for repair), and robotic. The surgical simulator associated with this surgical procedure may include a rib cage 28, a stabilizing base 24 and insert, variations in a sternum of the rib cage 28 to allow for a median sternotomy, and external tissue (e.g., silicon or other synthetic skin) used to cover the rib cage 28. The surgical simulator could be created as a closed system (i.e., air tight chest and skin) to allow for insufflation to be used in the minimally invasive approach. In instances where specific tasks within or a portion of the surgical procedure is to be taught/practiced, the surgical simulator may use plastic or other composite materials to simulate the anatomic variations such as, for example, core or wedge biopsy, trocar or incision placement, etc. In instances where the entire surgical procedure is to be taught/practiced or if a more realistic experience is desired, the surgical simulator may use biologic tissue that may or may not be surgically modified into specific anatomic variations, thereby recreating all key components of the procedure. Examples of biologic tissues include, but are not limited to, second trimester fetal bovine mediastinal block (e.g., heart, lung, larynx, trachea, thymus, esophagus and aorta). The surgical simulator may use any other biologic tissue that is size appropriate for the surgical simulator such as, for example, fetal porcine, chicken, rabbit, etc. A variety of endomechanical devices may be used to execute this surgical procedure. Examples of devices include, but are not limited to, tissue sealing devices, clips, biopsy devices, tissue staplers, suture, etc. An esophageal tube may also be used along with an endotracheal tube with or without lung ventilation to recreate more realistic challenges associated with anesthesia. A bronchoscope may be used to evaluate the trachea/bronchi prior to or during the surgical procedure.

A tenth example of a surgical procedure that may be conducted with one or more of the surgical simulators of the present disclosure includes duodenal atresia repair. Examples of simulators with which this surgical procedure may be performed include the simulators illustrated in FIGS. 20-25. This general surgical procedure encompasses all variations of anatomy such as, for example, annular pancreas or preduodenal portal vein (pancreas or portal vein obstructs the duodenum), duodenal web, complete atresia, or malrotation or normal interstinal rotation associated with duodenal atresia. This general surgical procedure also encompasses all surgical approaches through the abdomen such as, for example, laparoscopic (using minimally invasive techniques to repair), open (traditional approach) laparotomy, hybrid operation (using both minimally invasive and open techniques for repair), and robotic. The surgical simulator associated with this surgical procedure may include a lower rib cage 28, a pelvis, a stabilizing base 24 and insert, variations in the pelvis of the model to allow for pelvic congenital anomalies, and external tissue (e.g., silicon or other synthetic skin) used to cover the abdominal cavity (bordered by the lower ribs superiorly and the pelvis inferiorly). The surgical simulator may be created as a closed system (i.e., air tight abdomen and skin) to allow for insufflation to be used in the minimally invasive approach. In instances where specific tasks within or a portion of the surgical procedure is to be taught/practiced, the surgical simulator may use plastic or other composite materials to simulate the anatomic variations. In instances where the entire surgical procedure is to be taught/practiced or if a more realistic experience is desired, the surgical simulator may use biologic tissue that may or may not be surgically modified into specific anatomic variations, thereby recreating all key components of the procedure. Examples of biologic tissues include, but are not limited to, second trimester fetal bovine abdominal block (e.g., liver, aorta, inferior vena cava, stomach[s], spleen, pancreas, duodenum, small intestine, and large intestine). The surgical simulator may use any other biologic tissue that is size appropriate for the surgical simulator such as, for example, fetal porcine, chicken, rabbit, etc. A variety of endomechanical devices may be used to execute this surgical procedure. Examples of devices include, but are not limited to, tissue sealing devices, clips, biopsy devices, tissue staplers, suture, etc.

An eleventh example of a surgical procedure that may be conducted with one or more of the surgical simulators of the present disclosure includes gastrostomy tube (GT) placement. Examples of simulators with which this surgical procedure may be performed include the simulators illustrated in FIGS. 20-27. To perform this procedure, an infant or child is placed under full anesthetic. With the infant or child under a full anesthetic, a 3 or 4 mm telescope is placed through an umbilical ring and the stomach is visualized. A small incision is made in epigastric location of the anterior abdominal wall. Through this incision, the stomach is grasped using a laparoscopic fundus grasper. Two transcutaneous "U-stitches" are placed (through the skin, muscle, stomach and back out through the skin), which help stabilize the stomach for the GT placement. Air is instilled into the stomach through a nasogastric tube, distending the stomach. A needle and a guide wire are placed into the lumen of the stomach (see FIG. 27), the gastrostomy is dilated and then the GT is advanced over the wire and into the stomach. The balloon on the GT is filled with water and the guide wire is removed. The transcutaneous stitches are loosely secured around the GT. The infant or child is woken up and feeds may begin within hours through the GT.

As realized herein, a variety of different examples of surgical simulators are disclosed that include a variety of components, features, and functionality. It should be understood that the various examples of surgical simulators disclosed herein are capable of including any of the components, features, and functionality of any of the other examples disclosed herein in any combination, and all of such possibilities are intended to be within the spirit and scope of the present disclosure.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

While various examples of the disclosure have been described, it will be apparent to those of ordinary skill in the art that other examples and implementations are possible within the scope of the disclosure. Accordingly, the disclosure is not to be restricted except in light of the attached claims and their equivalents.

The invention claimed is:

1. A surgical simulator capable of being used to simulate surgery on tracheoesophageal fistula from a right portion of a rib cage sized and shaped to replicate a neonate, the surgical simulator comprising:
    at least a portion of a sternum sized and shaped to replicate at least a portion of a neonate sternum;
    a right portion of a rib cage extending from the sternum and including a first plurality of right ribs, wherein the right portion of the rib cage includes a removable portion including a second plurality of right ribs less than the first plurality of right ribs, wherein the right portion of the rib cage and the right ribs are sized and shaped to replicate a right portion of a rib cage and right ribs of a neonate;
    a right scapula coupled to the right portion of the rib cage, wherein the right scapula is sized and shaped to replicate a right scapula of a neonate;
    internal tissue positionable within the right portion of the rib cage, wherein the internal tissue represents a tracheoesophageal fistula; and
    external tissue adapted to cover at least a portion of the right portion of the rib cage.

2. The surgical simulator of claim 1, further comprising a right clavicle, wherein the right clavicle is sized and shaped to replicate a right clavicle of a neonate.

3. The surgical simulator of claim 1, wherein the second plurality of right ribs includes five right ribs.

4. The surgical simulator of claim 1, wherein the removable portion includes the second plurality of right ribs and a portion of the at least a portion of the sternum.

5. The surgical simulator of claim 1, wherein the removable portion includes at least one projection and the at least a portion of the sternum includes at least one aperture, wherein the projection and the aperture selectively cooperate to removably couple the removable portion to the at least a portion of the sternum.

6. The surgical simulator of claim 1, wherein the internal tissue is internal biologic tissue, and wherein the internal biologic tissue is modified from its original configuration to represent tracheoesophageal fistula.

7. The surgical simulator of claim 6, wherein the original configuration of the internal biologic tissue is second trimester fetal bovine mediastinal tissue.

8. The surgical simulator of claim 7, wherein the second trimester fetal bovine mediastinal tissue includes a heart, lungs, an aorta, a trachea and an esophagus.

9. The surgical simulator of claim 8, wherein the esophagus is transected at a level of a carina and purse-string sutured to a posterior of the carina, wherein a proximal end of the esophagus is shortened about one centimeter and then purse-string closed, wherein an esophageal gap is provided and is about two centimeters.

10. The surgical simulator of claim 1, wherein the internal tissue includes an esophagus with a proximal end of the esophagus ending in a blind pouch and a distal end of the esophagus being attached to a posterior trachea at a level of a carina.

11. The surgical simulator of claim 10, wherein the carina is located at a fifth rib of the plurality of first right ribs.

12. A surgical simulator capable of being used to simulate surgery on duodenal atresia of a neonate, the surgical simulator comprising:
    a rib cage including a plurality of right ribs and a plurality of left ribs, wherein the rib cage, the right ribs, and the left ribs are sized and shaped to replicate a rib cage, right ribs, and left ribs of a neonate;
    a pelvis, wherein the pelvis is sized and shaped to replicate a pelvis of a neonate, and wherein the rib cage and the pelvis define at least a portion of an abdomen, and wherein the at least a portion of an abdomen is sized and shaped to replicate at least a portion of an abdomen of a neonate;
    a base defining a first receptacle configured to receive at least a portion of the right ribs and a second receptacle configured to receive at least a portion of the left ribs, wherein, with the at least a portion of the right ribs and the at least a portion of the left ribs at least partially positioned in the first and second receptacles, the rib cage is supported and inhibited from movement, wherein the base defines a third receptacle configured to receive a first end of the pelvis and a fourth receptacle configured to receive a second end of the pelvis, wherein, with the right and left ends of the pelvis positioned in the third and fourth receptacles, the pelvis is supported and inhibited from movement;
    internal tissue at least partially positionable within the rib cage, wherein the internal tissue represents duodenal atresia; and
    external tissue adapted to cover at least a portion of the rib cage.

13. The surgical simulator of claim 12, wherein the internal tissue is internal biologic tissue, and wherein the internal biologic tissue is modified from its original configuration to represent duodenal atresia.

14. The surgical simulator of claim 12, further comprising at least a portion of a sternum connecting the plurality of right ribs and the plurality of left ribs, wherein the at least a portion of a sternum is sized and shaped to replicate at least a portion of a sternum of a neonate.

15. A surgical simulator capable of being used to simulate a lobectomy from a left portion of a neonate rib cage, the surgical simulator comprising:
    at least a portion of a sternum sized and shaped to replicate at least a portion of a neonate sternum;
    a left portion of a rib cage extending from the sternum and including a first plurality of left ribs, wherein the left portion of the rib cage includes a removable portion including a second plurality of left ribs less than the first plurality of left ribs, wherein the left portion of the rib cage and the left ribs are sized and shaped to replicate a left portion of a rib cage and left ribs of a neonate;
    a left scapula coupled to the left portion of the rib cage, wherein the left scapula is sized and shaped to replicate a left scapula of a neonate;
    internal tissue positionable within the left portion of the rib cage;
    external tissue adapted to cover at least a portion of the left portion of the rib cage; and
    a tissue stabilizer coupled to the rib cage for engaging the internal tissue.

16. The surgical simulator of claim 15, further comprising a left clavicle, wherein the left clavicle is sized and shaped to replicate a left clavicle of a neonate.

17. The surgical simulator of claim 15, wherein the second plurality of left ribs includes four left ribs.

18. The surgical simulator of claim 15, wherein the removable portion includes the second plurality of left ribs and a portion of the at least a portion of the sternum.

19. The surgical simulator of claim 15, wherein the removable portion includes at least one projection and the at least a portion of the sternum includes at least one aperture, wherein the projection and the aperture selectively cooperate to removably couple the removable portion to the at least a portion of the sternum.

20. The surgical simulator of claim 15, wherein the internal tissue is internal biologic tissue, and wherein the internal biologic tissue is modified from its original configuration to represent a congenital anomaly.

21. A surgical simulator capable of being used to simulate surgery on diaphragmatic hernia of a neonate, the surgical simulator comprising:
   at least a portion of a sternum sized and shaped to replicate at least a portion of a neonate sternum;
   a rib cage defining a cavity therein and including a left portion of the rib cage extending from the sternum in a first direction and a right portion of the rib cage extending from the sternum in a second direction opposite the first direction, wherein the left portion of the rib cage includes a first plurality of left ribs and the right portion of the rib cage includes a first plurality of right ribs, wherein the left portion of the rib cage includes a removable portion including a second plurality of left ribs less than the first plurality of left ribs, wherein the left portion of the rib cage is sized and shaped to replicate a complete left portion of a rib cage of a neonate, and wherein the right portion of the rib cage is sized and shaped to replicate a partial right portion of a rib cage of a neonate;
   internal tissue positionable within the cavity defined by the rib cage;
   a tissue stabilizer coupled to the rib cage for engaging the internal tissue, wherein the tissue stabilizer includes a first portion and a second portion adapted to be separated from one another, wherein the first portion includes a plurality of projections and the second portion includes a plurality of apertures adapted to receive the plurality of projections; and
   external tissue adapted to cover at least a portion of the rib cage.

22. The surgical simulator of claim 21, further comprising a support member coupled to the rib cage and defining a recess therein, wherein the tissue stabilizer is selectively positionable in the recess to couple the tissue stabilizer to the rib cage.

23. The surgical simulator of claim 22, wherein the tissue stabilizer is slideable into and out of the recess.

24. The surgical simulator of claim 21, wherein the second plurality of left ribs includes four left ribs.

25. The surgical simulator of claim 21, wherein the removable portion includes the second plurality of left ribs and a portion of the at least a portion of the sternum.

26. The surgical simulator of claim 21, wherein the removable portion includes at least one projection and the at least a portion of the sternum includes at least one aperture, wherein the projection and the aperture selectively cooperate to removably couple the removable portion to the at least a portion of the sternum.

27. The surgical simulator of claim 21, wherein the internal tissue is internal biologic tissue, and wherein the internal biologic tissue is modified from its original configuration to represent diaphragmatic hernia.

* * * * *